United States Patent
Gamble

(10) Patent No.: US 7,027,580 B2
(45) Date of Patent: Apr. 11, 2006

(54) METHOD AND SYSTEM FOR AUTOMATICALLY SENDING, RECEIVING AND UTILIZING INFORMATION TRANSMITTED OVER A COMMUNICATION NETWORK

(76) Inventor: Oliver Wendel Gamble, 436 E. 75th St., New York, NY (US) 10021

(*) Notice: Subject to any disclaimer, the term of this patent is extended or adjusted under 35 U.S.C. 154(b) by 164 days.

(21) Appl. No.: 10/739,971

(22) Filed: Dec. 18, 2003

(65) Prior Publication Data
US 2004/0151296 A1   Aug. 5, 2004

Related U.S. Application Data

(60) Provisional application No. 60/487,880, filed on Jul. 15, 2003, provisional application No. 60/444,564, filed on Feb. 3, 2003.

(51) Int. Cl.
*H04M 3/42* (2006.01)

(52) U.S. Cl. .................................. 379/218.01; 455/564

(58) Field of Classification Search .............. 379/93.17
See application file for complete search history.

(56) References Cited

U.S. PATENT DOCUMENTS

2003/0140091 A1 * 7/2003 Himmel et al. ............. 709/203
2005/0037744 A1 * 2/2005 Pines et al. .............. 455/414.3

* cited by examiner

*Primary Examiner*—Creighton Smith

(57) ABSTRACT

An apparatus for automatically sending, capturing, and utilizing requested information transmitted over a communication network. The utilization may take the form of saving and dialing a requested phone number, or the electronic storing and making known text information. The apparatus removes the need for manual interacting in the employment of its automated capabilities. The apparatus can communicates over the communication network with a provider of the information, instructing the provider to send the requested information (Phone Number or Text Information) in a recognizable electronic format. The apparatus will discern the nature of the retrieve information and act accordingly. If the information is a requested phone number, it will make known the phone number before dialing it. If the information is text information (i.e. address), it will make known the address to the recipient.

20 Claims, 16 Drawing Sheets

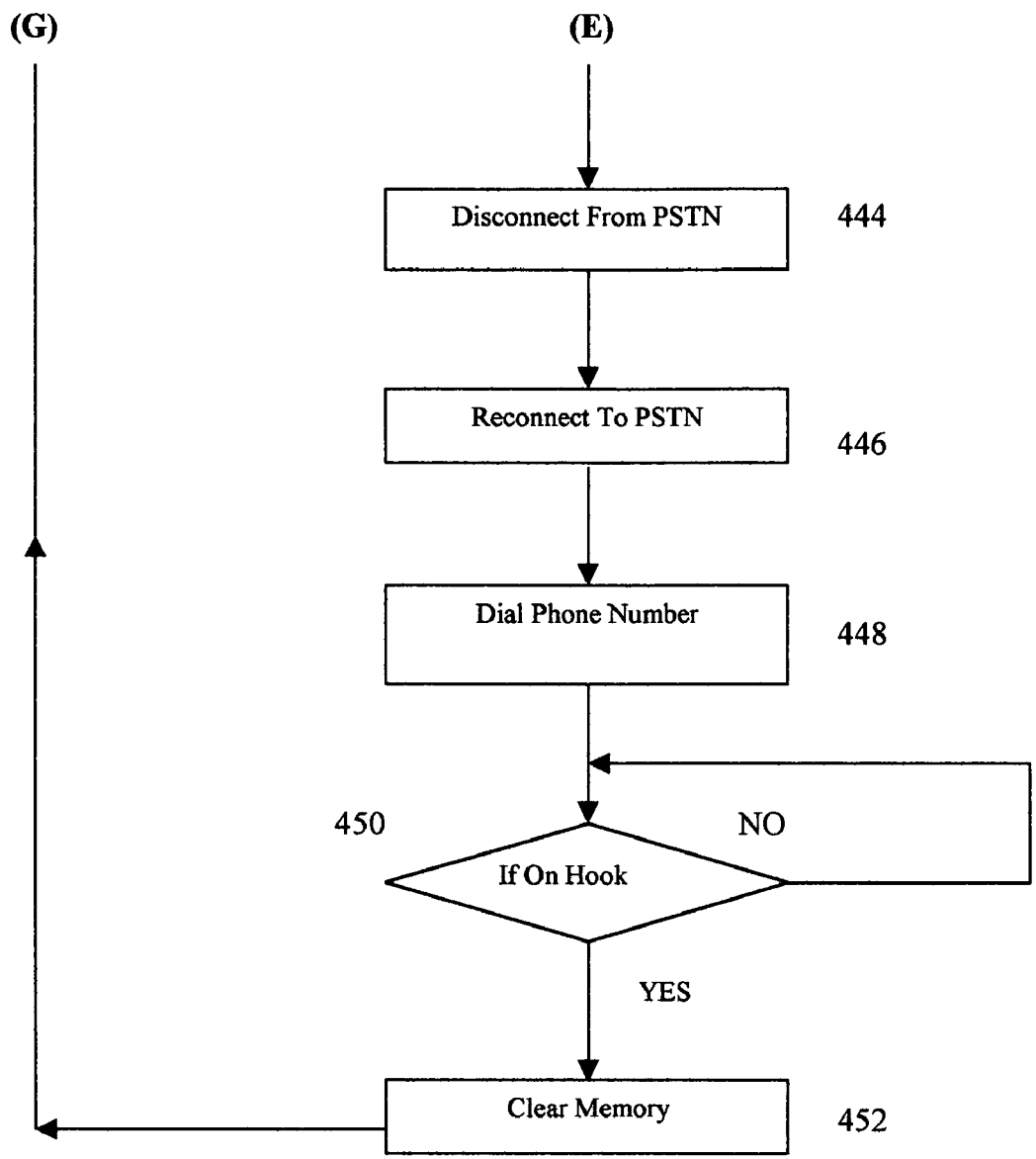

METHOD AND SYSTEM FOR AUTOMATICALLY SENDING, RECEIVING AND UTILIZING INFORMATION TRANSMITTED OVER A COMMUNICATION NETWORK

I claim the priority of provisional patent applications 60/487,880 filed on Jul. 15, 2003, and 60/444,564 filed on Feb. 3, 2003, these applications are incorporated by reference in their entirely.

FIELD OF THE INVENTION

The present invention relates generally to a method and system for removing the need for memorizing or writing down a phone number/address gotten from a source (Caller, Operator, or Directory Assistance) over a telecommunication network, more particular a method of electronically sending, capturing and dialing telephone a number.

BACKGROUND OF THE INVENTION

It so often happens that you cannot find a pen or pencil when you are getting a phone number or address from someone during a telephone call (i.e. a Caller, an Operator, or Directory Assistance). Trying to remember a string of unrelated spoken numbers or words can be difficult, and it can be costly if you dial the wrong long distance phone number. This problem can be exacerbated when you are using a public telephone and do not have readily available paper or pen to write down a telephone number that is ten or more digits long. Cell phone users might not even have a surface to write on. There exists a need for a method of easily dialing a phone number acquired over a communication network, especially for users of telephones: cell phones, home line phones, or public phones. Currently, the best Directory Assistance systems will provide the address and phone number information and then offer to dial it for free. Many Directory Assistance systems will provide the information to a customer and then offer to dial it for a small fee. Lastly, some Directory Assistance Systems are totally automated, and offer only the phone number that you have requested. However, there is no standard to the services provided by various Directory Assistance systems., and the telephone user can never be sure of what if any options will be offered, or if it will involve a fee. Most telephone users would prefer a system that allows them to quickly and easily obtain a desired phone number, review that phone number, and be able to dial the number without incurring an additional charge.

The system and method would increase the public safety, the efficiency and revenue of the various telephone companies, and would save the public's time and money. A system that allows Callers, Operators, or Directory Assistance (C.O.D.A.) to electronically send a requested telephone number or address or both to the requester's telephone directly, would reduce the amount of time that is spent on each customer. An electronic signal with the encoded phone number or address can be transmitted faster than a human can hear and write down a verbally transmitted phone number or address; therefore Operators and Directory Assistance will be able to serve more customers in the same period of time. The C.O.D.A. electronically sending the requested information will ensure that the proper phone number is dialed, reducing the chance that the phone number recipient will dial the received phone number incorrectly. This will reduce the amount of money customers spend on mis-dialed phone numbers. Hand-free dialing of phone number will greatly reduce distractions to mobile phone users, especially those driving cars.

SUMMARY OF THE INVENTION

Accordingly, an improved system and method are required which will allow a telephone user to dial a phone number obtained over a communication network, while avoiding transcription errors, extra service charges or the risk of dialing a wrong number. The method and system of this device solves that problem. According to one embodiment, the invention enables the user to electronically send a phone number to another telephone, and allow the recipient to dial that phone number without having to manually enter the sent phone number. In an alternate embodiment, the invention also supplies the address or other vital text information to the user without the need for the recipient to write it down.

This is accomplished by utilizing a device (a.k.a. Pitcher) that can automatically capture a phone number or text information sent over a tele-communication network, store and display the captured information, such as a phone number or address, and allow the recipient to dial the captured number with the press of a button, or automatically dial the number itself, depending on the Pitcher configuration. In one embodiment, a Ring, Off-Hook, and Time-out (R.O.T.) sensor array monitors both the phone and the telephone line connecting it to the communication network for activity. A phone is Active when it is in an Off-Hook state and able to accept instructions from the user of the phone. When an Active state is detected by the stamp working in conjunction with a DTMF (Dual Tone Multi-Frequency) transceiver, the Pitcher can determines if DTMF tones are incoming to the phone, and whether the tones are a possible telephone number that should be loaded into the Pitcher. DTMF tones are used to electronically encode the digits that comprise a telephone number. Each digit has its own unique DTMF tone that is recognizable. All phone numbers are a unique collection of DTMF tones (electrical signals) that can be transmitted over and understood by a tele-communication network. If the Pitcher detects DTMF tones in the Off Hook state (active state), it will capture and store them to memory. The Pitcher's microprocessing unit effectuates the decoding of the DTMF tones, storage of the decoded digits in the memory, evaluates the decoded digits to determine if they are a possible phone number, and determines what course of action to take. The Pitcher can dial the captured and stored phone number by effecting a hang up (On Hook state), re-connecting to the network (Off Hook state), and dialing the stored phone number by generating the corresponding DTMF tones. Finally, it should be noted that the method and system described herein enables users to recognize an easier, quicker, and more accurate way of collecting and dialing a phone number. Because some telephone companies supply phone numbers and information as a fee-based service, the ability to prevent mis-dialing is an added advantage to this invention.

BRIEF DESCRIPTION OF THE DRAWINGS

The present intention will become more fully understood from the detailed description given herein-below and the accompanying drawings which are given by way of illustration only, and therefore are not defining limitations of the present invention.

FIGS. 4A–4D is a flowchart of the steps performed by the pitcher system according to one embodiment of the system.

DETAILED DESCRIPTION

System of the Invention

Figure 1:
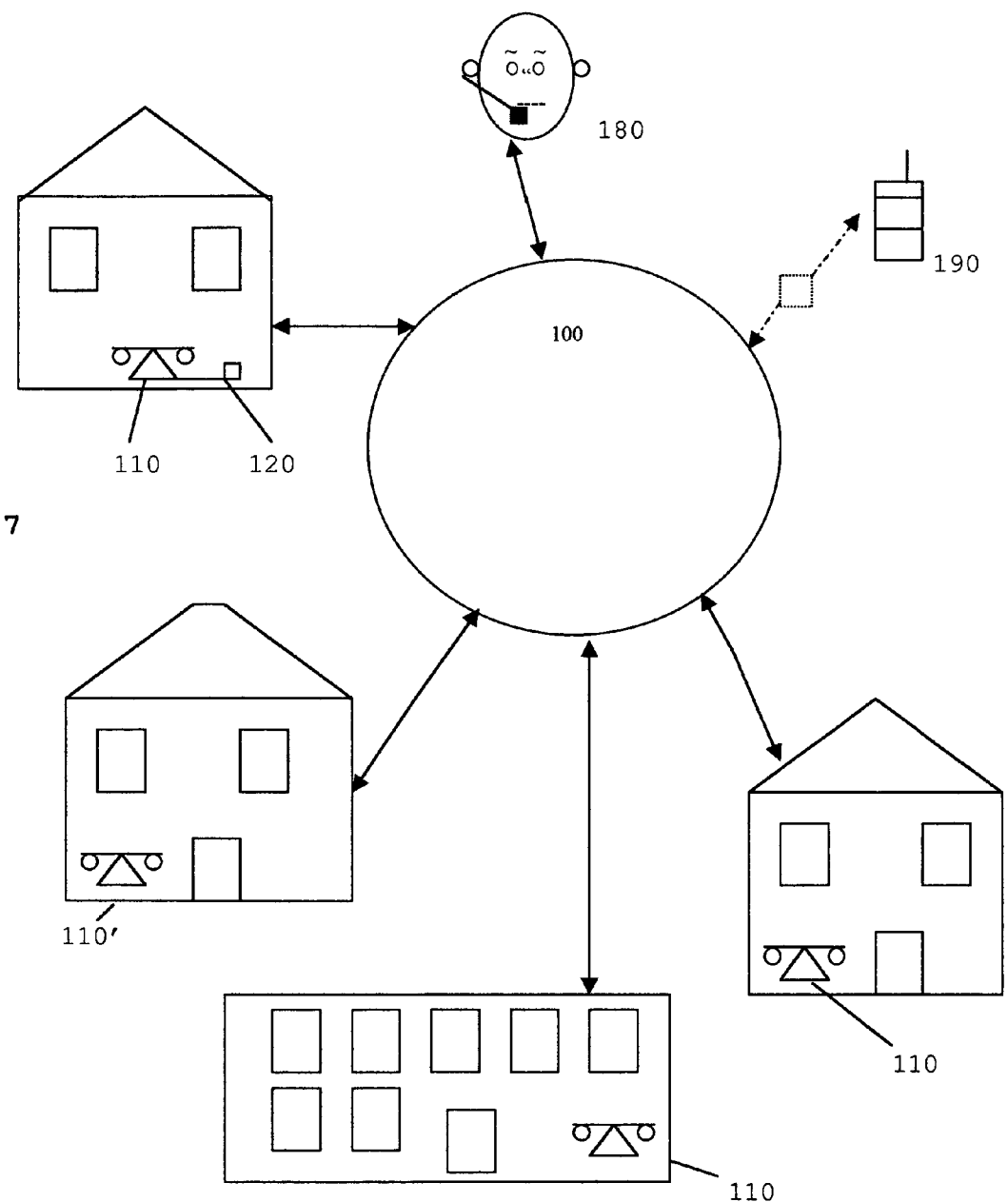
FIG. 1 illustrates a pitcher system according to one embodiment of the invention: a communication network and the devices that can be attached/linked to it.

FIG. 1 shows one embodiment of the system incorporating the pitcher 120. In this embodiment, the system includes telephones or user interface devices 110,110',190,190' connected to a network 100. Although, in one embodiment, the user interface device is a telephone, in an alternate embodiment, user interface device 110,110' may be a facsimile, computer, online access device, voice response unit or the like. The difference between 110 and 110', is that 110' has the Pitcher 120 integrated into the telephonic device. The user interface devices 190 and 190' are cell phones or other wireless devices with the Pitcher 120 attached to it externally 190, or incorporated into it 190'. The user interface device 190, 190' may be any wireless device, such as a cell phone, PDA, BlackBerry, etc. FIG. 1 shows an operator 180 that is connected to the network 100 who may supply requested telephone numbers and other information to various telephone customers. In another embodiment, a voice interactive computer system built into the network 100 can serve as an operator to supply information to customers. It should be noted that although references are made herein to telephone and user interface devices, these terms are used interchangeably and may include the other user interface devices listed above, as well as those that are not listed herein, that utilize telephony services to effectuate communication over network 100. As shown in FIG. 1, user interface devices 110, 110', 190, and 190' are connected to a network 100. Network 100 may be a public switched telephone network (PSTN). In an alternate embodiment, network 100 may be the Internet, World Wide Web or any network capable of effectuating long distance, regional and/or local telephony communications between users. The Network 100 enables any one of the interfacing user devices 110,110',190, 190' to be in communication with any of the other user interface devices (110,110', 190, 190'). The Pitcher 120 is able to capture, make known, and dial the phone number sent to it over the telecommunication network 100 from a C.O.D.A., if the C.O.D.A. is using the proper protocol. The Pitcher 120 can be internal to the user interface device, such as a circuitry within a telephone, or an external to the user interface device, such as a stand-alone unit. In either case, the Pitcher 120 should be attached to the user interface device 110,110',190, 190' in such a manner as to enable it to detect electronic signals, such as DTMF tones, coming from the PSTN, and be able to enter DTMF tones or electronic signals into the PSTN. The Pitcher 120 can be programmed to suit the user's needs, dial the captured phone number on its own, or wait for a trigger signal. The Pitcher 120 can also be programmed to dial the captured phone number automatically, unless cancel instructions are sent to the Pitcher 120. The pitcher 120 can be programmed to dial the captured phone number manually: i.e., the pitcher 120 will wait until the phone user presses a certain button or combination of buttons before dialing the captured phone number.

Encoding Text and Phone Numbers For Transmission

There are two pathways to send signals within a communication network: In-Band and Out-Of-Band. The term signals can include digits that you dial, dial tones, off hook, ringing, busy, voice/conversation, et cetera. Signal System 7 (SS7) is an internationally recognized standard created by the International Telecommunication Union (ITU). The SS7 standard defines procedures and protocol by which network elements in a public switching telephone network (PSTN) exchange information over a digital signaling network (Interoffice Signaling).

SS7 is designed to regulate the back end of the phone system by transmitting instruction code in small packets on an alternate circuit known as Out-Of-Band. The Out-Of-Band signal carries such information as calling party number, routing information related to phone number dialed, current location information for roaming wireless subscribers, busy signal, dialed touch tones, off hook state, call setup instructions, call break down information, and everything except voice/conversation. In-Band Signaling carries conversation and DTMF tones. DTMF tone travels in the conversation circuit, but can be detected in the Out-Of-Band circuit. SS7 has become the primary mode for signaling and information transfer in today's wireless and wired networks.

In one embodiment of the invention, SS7 can enable PSTN to be programmed to detect and route a Directory Assistance request from a Pitcher-enabled telephone to Directory Assistance (C.O.D.A.) that is capable of interacting with Pitcher-enabled telephonic devices. The American National Standards Instituted (ANSI), a non-government, non-profit standard-setting institute, creates and publishes standards that are voluntarily accepted by industry. ANSI is the official U.S. member of the World's leading Standard bodies. ASCII (American Standard Code for Information Interchange) is a code developed by the ANSI. ASCII includes several versions, such as standard (seven bit) and extended (eight bit). ASCII is a character and command code. ASCII is the standard code that is employed by computers, to communicate what keys are pressed on the keyboard to the microprocessor. The ASCII code gives representation for all of the keys on the keyboard in binary and numeric format. When you press a key on the keyboard, a binary code for that key is transmitted to the computer.

Binary code is the representation of a decimal number by a series of zeroes and ones (0011 0000=0, 0011 0001=1, 0011 0010=2, et cetera). As illustrated in the "Samples From ASCII Table" both digits and alphabet characters can be represented by binary coding, and binary coding represented by digits. The ability to represent ASCII characters as decimals allows for transmitting ASCII-coded text as DTMF tones.

| Samples From ASCII Table | | |
| --- | --- | --- |
| ASCII Character | Binary | Decimal |
| 0 | 0011 0000 | 048 |
| A | 0100 0001 | 065 |

The number '0' (zero) can be encoded by the DTMF tone for "0", "4", and "8", and the character 'A' can be encoded in DTMF tones by "0", "6", and "5". Thus, both numbers and text may be transmitted via DTMF tones.

Pitcher

Figure 2:
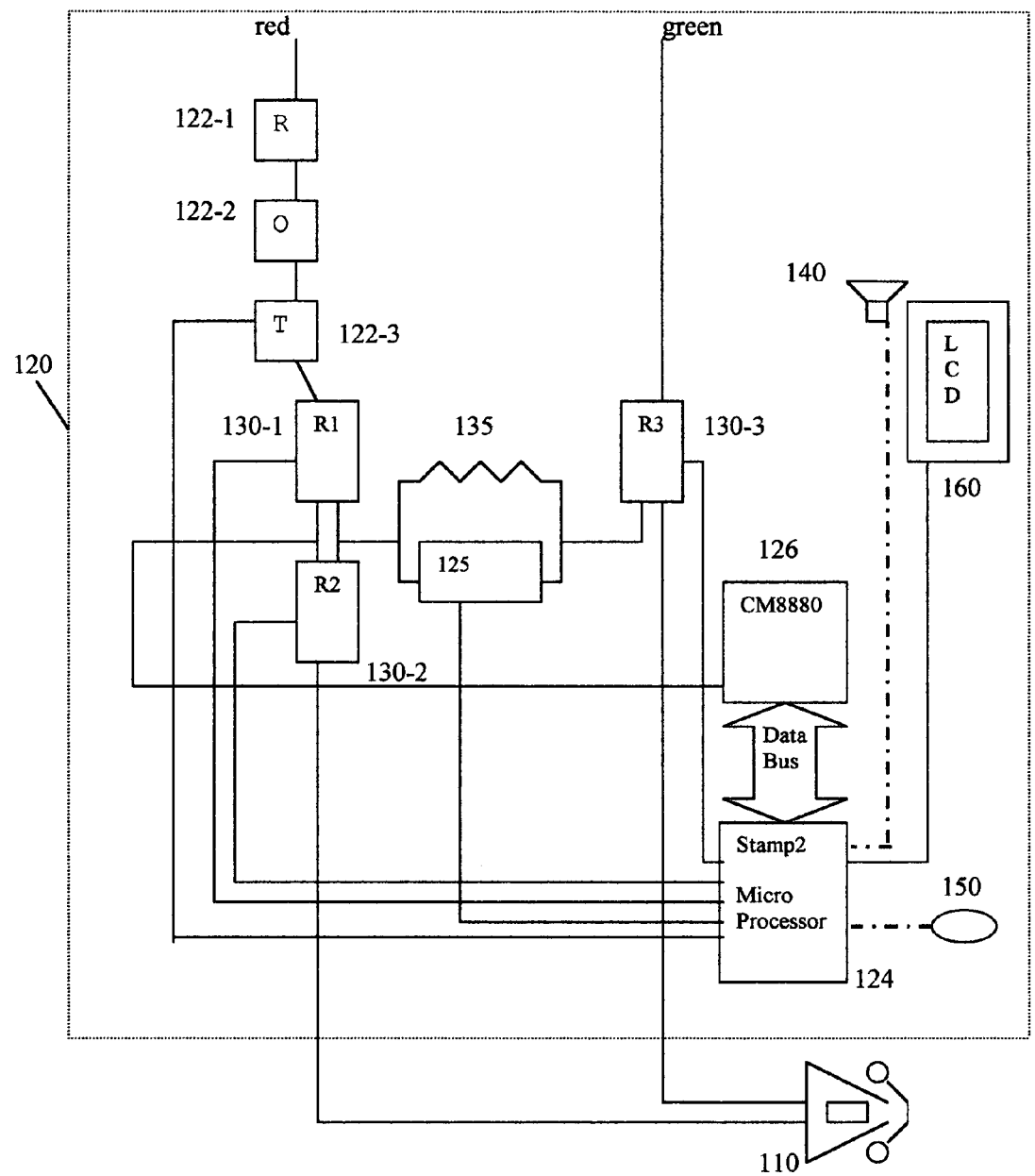
FIG. 2 illustrates one embodiment of the pitcher shown in FIG. 1: diagram of an external Pitcher that can be attached to a line phone.

FIG. 2 illustrates one embodiment of the Pitcher 120 used in the system shown in FIG. 1, where the Pitcher 120 is externally attached to a phone 110. The main components of the Pitcher 120 are a sensor array 122, relays 130, stamp 124 (containing a micro-processing unit, EEPROM, clock, and RAM), a 2 kilo-ohms @ 5 watts resistor 135, DTMF (Dual Tone Multi-Frequency) decoder chip 126, telecommunication transformer 125, voltage regulator (not shown), speaker 140, microphone 150, display panel 160, audio chip 170, and power supply (not shown). The Pitcher 120 is interposed between and in communication with the user interface device 110 and the network 100 as shown in FIGS. 1 and 2.

In another embodiment, the Pitcher 120 may be incorporated into the user interface device 110', though such a configuration may not require all of the above-mentioned components. If the user interface device 110' has its own microprocessor and RAM memory, then it may be possible for the Pitcher (120) to share these and any other components that are common to both.

The sensor array 122 may consist of the following three sensors: ring sensor 122-1, an answer/off-hook sensor 122-2, and a time out sensor 122-3. These sensors will be termed R.O.T. for Ringing, Off-Hook State, and Time out. The ringing sensor 122-1, in one embodiment comprises an alternating current optoisolator coupler. The coupler may be attached to the phone line by a reverse facing diode, allowing only negative current to flow through the diode and trigger of the coupler. In a wired phone system, ringing is a process that employs both positive and negative moving current. The reverse facing diode allows only the negative current to reach the coupler. The light emitting diode inside the coupler, in one embodiment, activates a photo-transistor. The photo-transistor allows current to flow through it to a pin on the stamp microprocessor (FIG. 2-124). The stamp microprocessor detects the current as a high signal, indicating ringing of the phone.

The off hook/answering sensor 122-2, in one embodiment, comprises an alternating current optoisolator coupler. The coupler is attached to the phone line by a forward facing diode, allowing only positive current to flow through the diode and trigger the coupler. When the phone 110 is off the hook, current flows through the phone line to the coupler. The light emitting diode inside the coupler activates a photo-transistor. The photo-transistor allows the current to flow through it to a pin on the stamp 124 microprocessor. The stamp 124 microprocessor detects the current as a high signal, indicating the off hook status of the phone.

The time-out sensor 122-3, in one embodiment, is comprised of an alternating current optoisolator coupler and a triac. The coupler is attached to the phone line with leads coming from both the ring and off hook sensors. When the phone 110 is off hook, current flows through the line to the coupler. The light emitting diode inside the coupler activates a photo-transistor. The photo-transistor allows a signal current to flow through it to a pin on an optoisolator triac. The triac is activated by a signal from the stamp 124 microprocessor. The stamp microprocessor sends a one-time activation signal to the triac after it has determined that the phone 110 is off hook to make an outgoing phone call. This late activation/signaling of the triac prevents the time-out sensor 122-3 from falsely reading the ringing or answering incoming call as a time out. While the phone is off the hook, the triac will pass a current through a photo-transistor to the stamp 124 microprocessor. The triac will continue to pass current and maintain the high pin state until a circuit break occurs, resulting in a momentary drop in current (and voltage) followed by a resumption of current (and voltage). The stamp 124 microprocessor sends a signal to activate the triac each time the power flowing through it is momentarily halted and the high signal on the time-out pin is turned off. This continues until the triac is reactivated. The triac is activated once per outgoing telephone call. The absence of a high signal on the pin attached to the triac indicates expiration of the allotted time to completely dial a valid phone number. The DTMF transceiver 126 can encode and decode sixteen distinct electrical signals, particularly the signals that code for the digits 0 to 9, and the "#" and "*" symbol.

The optoisolator coupler employed, in one embodiment, is part number H11AA814AQT-ND or H11AA814QT-ND manufactured by Optoelectronics. The optoisolator triac may be part MOC3010QT-ND also manufactured by Optoelectronics. Of course, other components and/or configurations may be used for accomplishing such monitoring. The relays 130 used in one embodiment of the Pitcher 120 have both a normal closed circuit and a normal open circuit. The application of a current to the coil will cause the normally open circuit to close, and the normally closed circuit to open. The default state (no power applied to the coil) allows the telephone call to pass through the Pitcher (FIG. 2-120). When a current is applied to the coils of the relay 1 (R1) 130-1 and relay 2 (R2) 130-2 an alternate path is opened, one that routes the phone line to the DTMF encoder/decoder 126. This routing of the phone line allows the stamp 124 microprocessor to monitor/read DTMF tones present on the phone line, coming in from the network 100.

The stamp 124 microprocessor initiates and monitors for DTMF tones whenever it detects an Off Hook state via the sensors 122. Detection of the Off Hook state by the Pitcher's stamp 124 microprocessor activates relay 1 130-1 and relay 2 130-2. When the stamp 124 microprocessor activates relays 1 and 2 130-1,130-2, it enables the stamp 124 microprocessor to read the DTMF tone encoded digits.

There are three major embodiments of the Pitcher 120. In the preferred embodiment, the Pitcher 120 captures and saves to memory the phone number that is bracketed between a pre-designated start and end signal. In the second embodiment, the stamp 124 microprocessor captures and saves to memory the first 10-11 DTMF tones or digits detected while the telephone 110, 110' is in an Off-Hook state, depending on the presence of a one ("1") in the first position of the captured digits/phone number. The third embodiment involves the format and composition of DTMF tones detected in an outgoing call: phone number/digit composition that commonly corresponds with Directory Assistance/Information (i.e.: "0", "XXX5551212", or "411").

In the preferred embodiment there is querying/handshaking performed by the Pitcher 120 and C.O.D.A. The C.O.D.A. may query the phone it is in communication with via an electrical signal such as two pound signs ("##"), to see if that phone has Pitcher 120 functionality. If the phone is pitcher-enabled, the phone 110,110' will respond by sending a signal back to the C.O.D.A., such as "**" (two asterisk symbols), indicating Pitcher 120 capability. Having received the proper return signal, Directory Assistance can send the requested phone number in the optimum format to the caller. This will prevent the C.O.D.A. from sending requested information in an inappropriate format, i.e., sending DTMF tones to a non Pitcher enabled phone.

The Pitcher 120 can be programmed to enhance the captured phone number with any combination of digits required by the user's phone system for accessing an outside line (i.e. "9").

In the preferred embodiment, a Pitcher-enabled telephonic device will monitor a telephone line for the presence of the DTMF tones corresponding to the pound signs "##". The monitoring process starts when the phone first goes Off Hook, and will remain active until the phone line goes to an On-Hook or a Time-Out State. If the Pitcher 120 detects a query signal from a C.O.D.A. it will respond with a double Asterisk (**) signal. The Pitcher 120 will attempt to capture and store to memory all of the DTMF tones that are bracketed between two sets of DTMF tones, such as a Pound and Asterisk symbol followed by an Asterisk and a Pound symbol (i.e. #*12121231234*#). The type and quantity of symbols bracketing the phone number is not restricted to those indicated, but can be replace with any type or number of electrical signals that work in a similar manner. If there are nine digits or less detected, the Pitcher 120 will treat the DTMF tones as a whole phone number unless otherwise programmed: i.e. 911. If ten (10) digits are detected and the first digit is not a "1", then the Pitcher 120 will treat the captured DTMF tones as a phone number with an area code (the Pitcher 120 will supply the "1" at the beginning of the phone number). The Pitcher 120 can be programmed to accept any given number of digits as a valid phone number, not just 3, 7, or 11 digits grouping. The Pitcher 120 will assume that the digits captured between the start and end signal constitute a valid phone number. This will allow the Pitcher 120 to be adaptable to phone systems in countries that have a different standard number of digits in a phone number.

In the preferred embodiment, the Pitcher 120 will make known the captured phone number by one of two methods, visual display or audio. The microprocessor 124 is linked to an audio chip 170 that has the digits 0–9 stored in its memory. The audio chip (170) is prompted by the microprocessor (124) to play out the captured phone number digit by digit at a timely interval (~0.5 seconds intervals). This will enable the Pitcher 120 user to know the phone number that is about to be dialed. Another method of making known the captured telephone number is to display the number on a display screen, such as a LCD screen (FIG. 2-160). A serial connection between the microprocessor 124 and the (liquid crystal display) LCD screen can be employed to display the captured phone number. Since wireless devices employ some form of display screen, the display capability may be used by a Pitcher-enabled wireless device 190, 190'. The Pitcher 120 can be programmed to terminate the dialing process when a designated key or combination of keys on the phone keypad is pressed. Once the "End capture" signal is saved to memory ("*#" DTMF tones), the microprocessor 124 will activate relay 1 130-1 and deactivates relay 2 130-2 and relay 3 130-3 in the present embodiment. This will break the connection between the Phone 110, 110' and the communication network 100.

In an alternate embodiment, a different set of electrical signals, a combination of electrical signals, or a signal in a position other than the end position of the captured phone number may activate disconnection of the Pitcher-enabled Phone 110,110' from the network 100. Once relay 1 130-1 is activated, relay 2 130-2 and relay 3 130-3 are deactivated, the phone 110,110' is isolated, and an on-hook state is presented to the telephone network. In one embodiment, the relays 130 used are part #G6E-134P-ST-US-DC5 made by Omron. Of course, other components and/or configurations may be used for accomplishing such control over the telephone line wiring. A tele-communication transformer TTC-105 by Tamura Microtran is attached on one side to the 2 Kilo-ohm resistor in a parallel manner with the incoming lines from the wall. The other side of the transformer is connected to the microprocessor and ground.

The Pitcher 120 can be programmed to initiate the dialing process, once it has determined that the stored phone number is complete and valid. When the Pitcher 120 is ready to dial the stored phone number it must first effect an On-Hook state (hang-up of the phone), ending its connection to the source of the stored phone number. Then the Pitcher 120 must establish an Off-Hook state (equivalent to picking up the receiver/handset of a telephone) before it can dial the phone number. In FIG. 2, the Pitcher 120 is attached to a wired/land line phone 110, 110' whose microprocessor 124 achieves an off-hook state by activating relays 2 and 3 130-2,130-3, and deactivating relay 1 130-1. This configuration of active and inactive relays will re-connect the telephone 110,110' to the network 100 in a manner that will allow the Pitcher 120 to dial the captured phone number. In another embodiment, other arrangements of active and inactive relays can achieve the same results. When the lines are manipulated in this manner the phone 110,110' will appear to the communication network 100 as if it is in an outgoing call state. The microprocessor 124 will generate DTMF tones on the pin connected to the telecommunication transformer 135. These DTMF tones correspond to the stored telephone number. The network 100 will detect the generated DTMF tones the same way it would detect a manually dialed phone number.

In an alternate embodiment, the Pitcher 120 will only dial the stored phone number once the user presses a start button or combination of buttons. The Pitcher 120 will effect a hang-up and break the connection with the source of the captured telephone number. Next, it will reconnect to the network 100 and initiate the dialing process. The Pitcher 120 will dial the captured telephone number stored in memory by generating the DTMF tones that correspond to the digits stored in memory. The DTMF tones will be introduced into the telecommunication network by the telecommunication transformer 135. A stamp 124 is employed by the Pitcher 120 and comprises a Pic-micro-controller chip (microprocessor), PBasic interpreter chip (software language used to program the micro-controller), EEPROM (electrically erasable programmable read only memory), RAM (Random Access Memory), a clock and ports through which information and instructions can be passed. In this embodiment these ports are call pins, and each pin may be in either a high or low state. The micro-controller uses the state of the sensor pins to monitor the phone line for activity. The sensors 122 are attached to specific pins on the micro-controller of the stamp 124, and when these pins go high or low, the micro-controller, via the program stored in its memory, can determine what is happening. The micro-controller is able to detect an Off-Hook state (active phone state) by monitoring the pin connected to the Off-Hook sensor. The relays 130 used in the Pitcher 120 are attached to specific pins of the micro-controller of the stamp 124 The micro-controller recognizes which pin is attached to which relay, and the program tells the micro-controller when each relay 130 should be employed. The micro-controller can activate a specific relay by outputting a small voltage to the pin attached to that relay coil. When the pin goes high the relay is activated, and when the pin goes low the relay is deactivated. In one embodiment, stamp II 124 is manufactured by Parallax Inc./Microchip Technology (part # Pic 16C57). Of course, other components and/or configurations may be used for accomplishing such control and monitoring of telephone line activity.

The CM8880 DTMF transceiver 126 is a fully integrated DTMF transceiver. This transceiver 126 may be interfaced with a computer/microprocessor to detect and interpret DTMF signals. The DTMF transceiver 126 is attached to the telephone 110,110' via the alternate path created when relay 1 (130-1) and relay 2 (130-2) are activated. By placing the DTMF transceiver 126 connection to the alternate path of the phone line, it is protected from the high voltage of the phone ringing. The phone ring consists of both forward and backward flowing (AC) current at a voltage level that could otherwise damage the DTMF transceiver (126). Once the microprocessor detects an Off-Hook state, it triggers the relays 130 that bring the DTMF transceiver 126 in contact with the phone line. This will enable the DTMF transceiver 126 to interpret the DTMF tones on the phone line, and pass it to the microprocessor. Although the current embodiment employs a CM8880 DTMF transceiver made by California Micro Devices (Part # CM8880PI), other components and/or configurations may be used for accomplishing such decoding and encoding of DTMF signals. A standard 9-volt and a standard 5-volt regulator may be employed as a power source for the Pitcher 120. The 5-volt supply may be used to power the DTMF transceiver 126, the relays 130, and the sensors 122 to signal the microprocessor of the stamp 124. The 9-volt source powers the isolated telephone 110, 110'. The 5 volt and 9 volt regulators use by the Pitcher 126 may be, in one embodiment, Japan Radio Company part # NJM7805-FA and NJM7809-FA, respectively. Of course, other components may be used for accomplishing such regulation of voltage.

Pitcher Sensory Process For Wired Phones

The processes of the Pitcher 120 may be divided into four functions: (1) monitoring the telephone line for activity; (2) determining whether a detected string of DTMF tones is requested information (phone #/text); (3) making known any captured information (phone #/text); and (4) dialing the captured phone number. These processes are described below in detail with reference to FIGS. 1–4 & 9.

In FIG. 2, the Pitcher 120 is external to the phone 110, situated between the phone 110 and the wall jack. The phone line between the wall and the telephone 110 may be comprised of two wires. In one embodiment, the optoisolator of the "O" (off hook/answer) sensor 122-2 and "R" (ringing) sensor 122-1 are arranged in parallel with the telephone's red wire coming from the wall socket. The optoisolator of the time-out sensor 122-3 is arranged in series with "0" (off hook/answer) sensor 122-2 and "R" (ringing) sensor 122-1. This allows the phone line activity to power the sensors. Relay 1 is connected to Relay 2 130-2, and relay 2 is connected to the telephone 110. Relay 3 130-3 is attached the other wire in the line coming in from the wall and going to the phone 110. In this embodiment relay 3 (130-3) is attached to the green wire. The sensors 122 are attached the red wire in the preferred embodiment.

The Pitcher 120 uses a sensor array 122 to monitor the telephone line for activity (i.e., ringing of the phone, answering an incoming call, or initiating an outgoing call). In FIG. 2 the sensor array 122 is denoted as 122-1 (ring), 122-2 (off hook/answer), and 122-3 (time out)—R.O.T. The "O" (off hook/answer) sensor 122-2 is connected to the stamp 124 at a pre-determined pin. While this pin remains in a low state, the stamp 124 recognizes that the phone 110 is still on the hook (phone is inactive). The telephone 110 is considered active when it is ringing, being answered, or being used to make an outgoing call. When the phone 110 is active the pin for the "0" (off hook/answer) sensor 122-2 is in a high state.

Upon detecting a high state on the "O" (off hook/answer) sensor pin, the stamp 124 utilizes software to determine the exact nature of the phone's active state. The stamp 124 briefly polls the pins for both the "R" (ringing) and "O" (off hook/answering) phone sensors. The stamp 124 monitors the phone line for activity that is specific to each of the three possible activities (FIGS. 3A–3C).

Figures 3A, 3B, 3C:
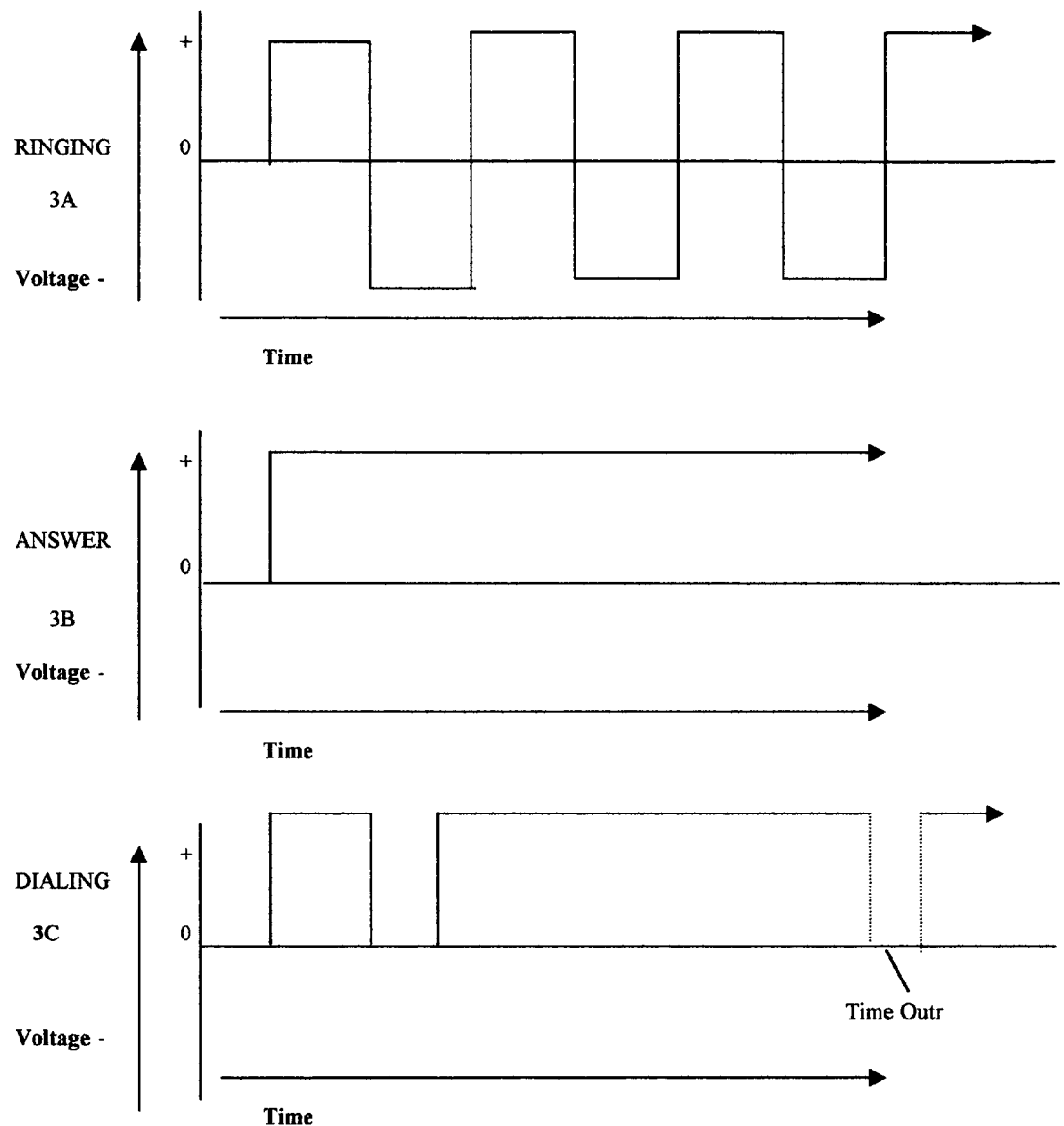
FIGS. 3A–3C are charts illustrating the various signals and states that can be detected the pitcher system according to one embodiment of the system.

In this embodiment the Pitcher will recognize an incoming call when the stamp 124 detects a pattern similar to FIG. 3A, alternating current. Detection is achieved when the AC current encounters the reverse facing diode, that allows on the negative portion of the ringing signal to pass through it to the ring sensor (122-1). This will generate a series of periodic high states on the "R" sensor pin of the Stamp.

In this embodiment the Pitcher will recognize an off hook (answering an incoming call) state when the stamp 124 detects a pattern similar to FIG. 3B. The "O" (off hook/answer) sensor 122-2 goes high and remains high until the telephone call is over.

In this embodiment the Pitcher will recognize an outgoing call when the stamp 124 detects a pattern similar to FIG. 3C. A brief pause in the flow of current through the "O" (off hook/answer) sensor 122-2 and the absence of a high on the "R" sensor. After the brief pause, the current will resume to flow and continue to flow until a time out occurs. A time-out is defined as a condition in which the phone company has determined that the phone 110 has been off the hook for a predetermined period of time and no valid phone number has been entered (FIG. 3C). When this occurs, the phone company may interrupt the calling process with a message instructing the caller to please hang-up and try again. In this embodiment, such message is termed the "time out message."

When the stamp 124 detects a high on the "O" (off hook/answer) sensor pin, it briefly polls both the "O" (off hook/answer) sensor 122-2 and "R" (ring) sensor 122-1 for status. If a high on the "R" (ring) sensor 122-1 is detected, a ring-flag is changed from "0" to "1" in the software. The stamp 124 likewise changes the call-flag from "0" to "1", if the high on the "O" (off hook/answer) sensor pin is briefly interrupted. The stamp 124 continues the polling process until it no longer detects a high on the "R" (ring) sensor 122-1 during a polling cycle. Upon detecting a high on the ring sensor, the stamp 124 will restart the polling cycle. Once the ringing stops, or if no ringing is detected within a polling cycle, the stamp 124 polls the "O" (off hook/answer) sensor 122-2 to determine the "call-flag" status. If the call-flag has a value of the "1", and the ring-flag has a value of "0", and the "O" sensor is high, then the stamp 124 recognizes that the call is outgoing. If the ring-flag has a value of "1" and the call-flag has a value of "0", and the "O" sensor is high, then the stamp 124 recognizes that the call is an answered incoming call. For a summary see Table 1.

TABLE 1

| Ring-Flag | Call-Flag | Off Hook/Answer Sensor Status | Meaning |
|---|---|---|---|
| 1 | 0 | Low | Phone Ringing But Not Answered |
| 1 | 0 | High | Answer Incoming Call |
| 0 | 1 | High | Outgoing Call |
| 1 | 1 | High/Low | Phone is Ringing |

The stamp 124 recognizes the "O" (off hook/answer) sensor pin going low and remaining low as the completion of an active event. Once the "O" sensor goes back to a low state, the stamp 124 resets itself and goes back to polling the phone line for activity. In one embodiment, the "O" (off hook/answer) pin goes low and remains low once the call is completed and the phone (110,110') is placed back on the hook. The various states of the phone can be determined by other sensor configurations and sensory components, and the scope of this invention should not be limited to those described above.

Wired Telephone Coding

The process of detecting and dialing a captured telephone number using a wired phone 110, 110' will now be described referring back to FIGS. 1–4. In the preferred embodiment, once an Off Hook state is detected, the stamp programming will monitor the lines connecting the phone to the communication network for DTMF tones. Knt (FIG. 4—step 402), is a Counter flag, that is used to keep track of the number of DTMF tones (digits) detected. The counter "KNT" is used to determine when enough DTMF tones have been captured to perform a process. A minimum of two DTMF tones are required to check for a C.O.D.A. query, which consists of two pound symbols: "##"). In the beginning of the process, the counter "KNT" is set to zero (0).

The Sflag, (FIG. 4 step 402), is a Start Flag, that is used to indicate the start of the telephone number tag is detected ("#*"). The Start Flag is used to tell the Pitcher which part of the string of DTMF tones collected constitute the phone number.

The Eflag (FIG. 4 step 402), is an End Flag that is used to indicate the detection of the end of the incoming telephone number (string of DTMF tones that constitute the phone number). This flag is used by the system to indicate that a complete number has been captured.

The Qflag is a C.O.D.A. query detection indicator that the Pitcher uses to indicate when a C.O.D.A. query is detected. This is how the Pitcher indicates that it is in contact with a site that can send information in a DTMF tone format.

Figure 4A:
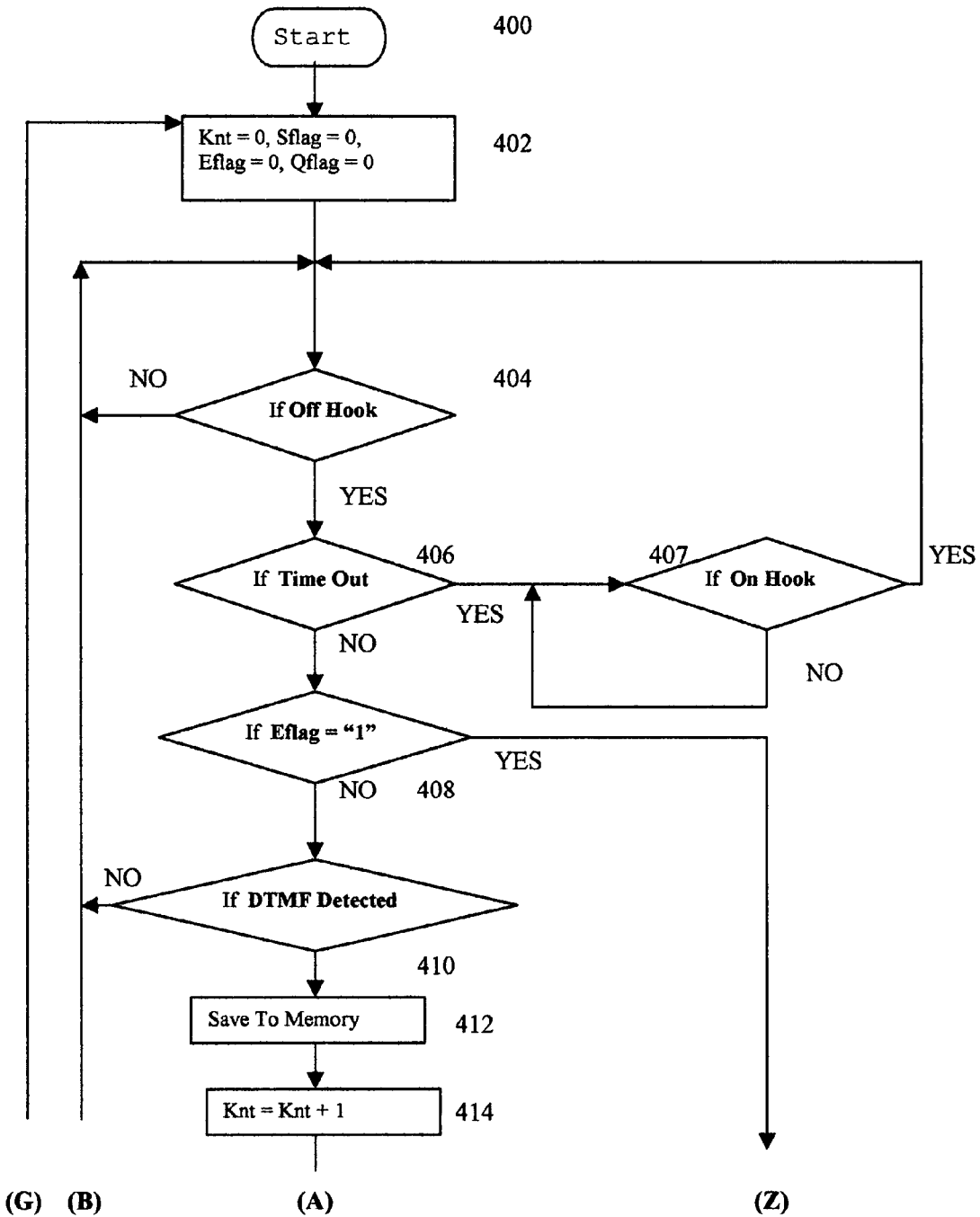
Figure 4B:
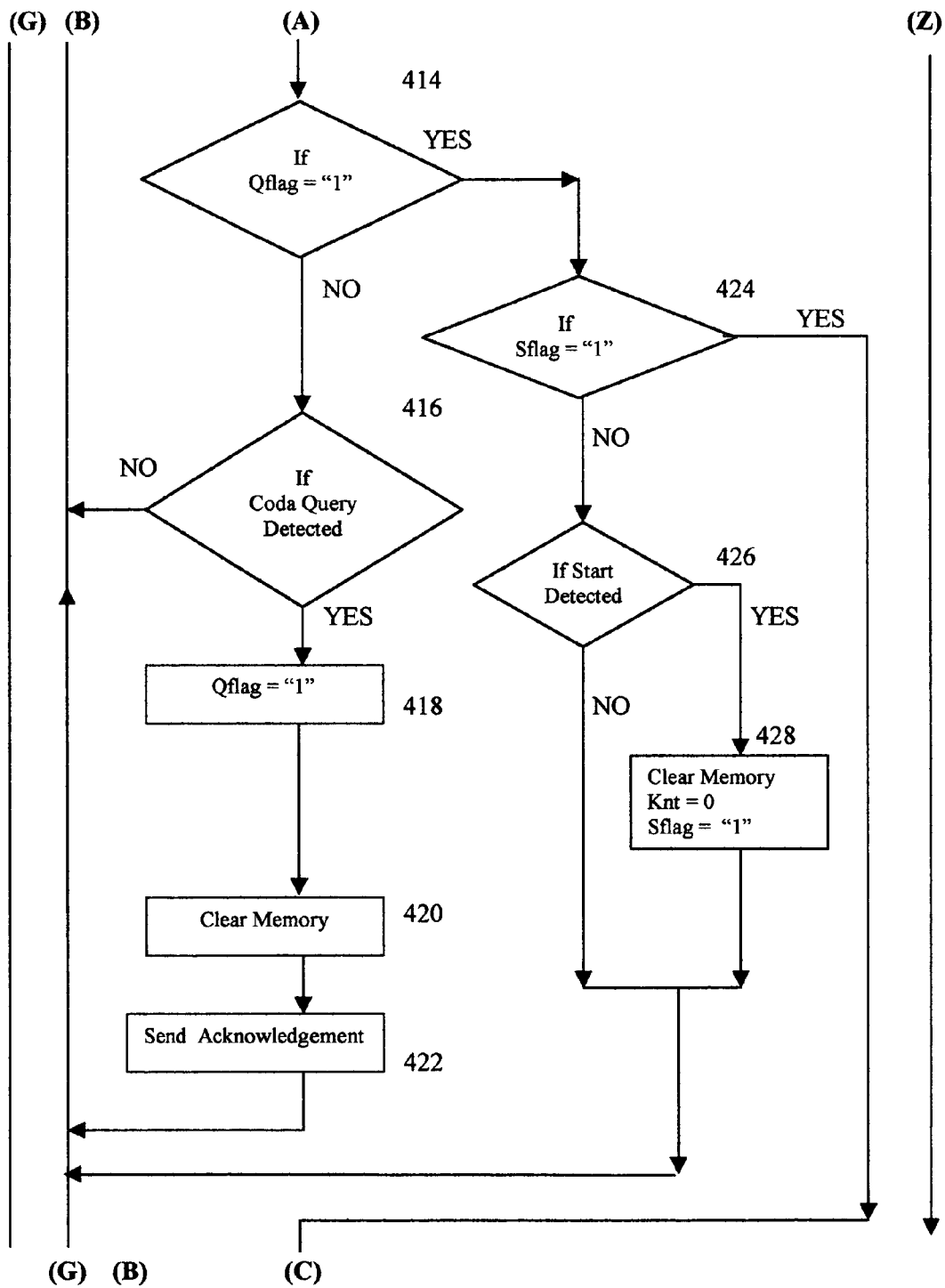
Figure 4C:
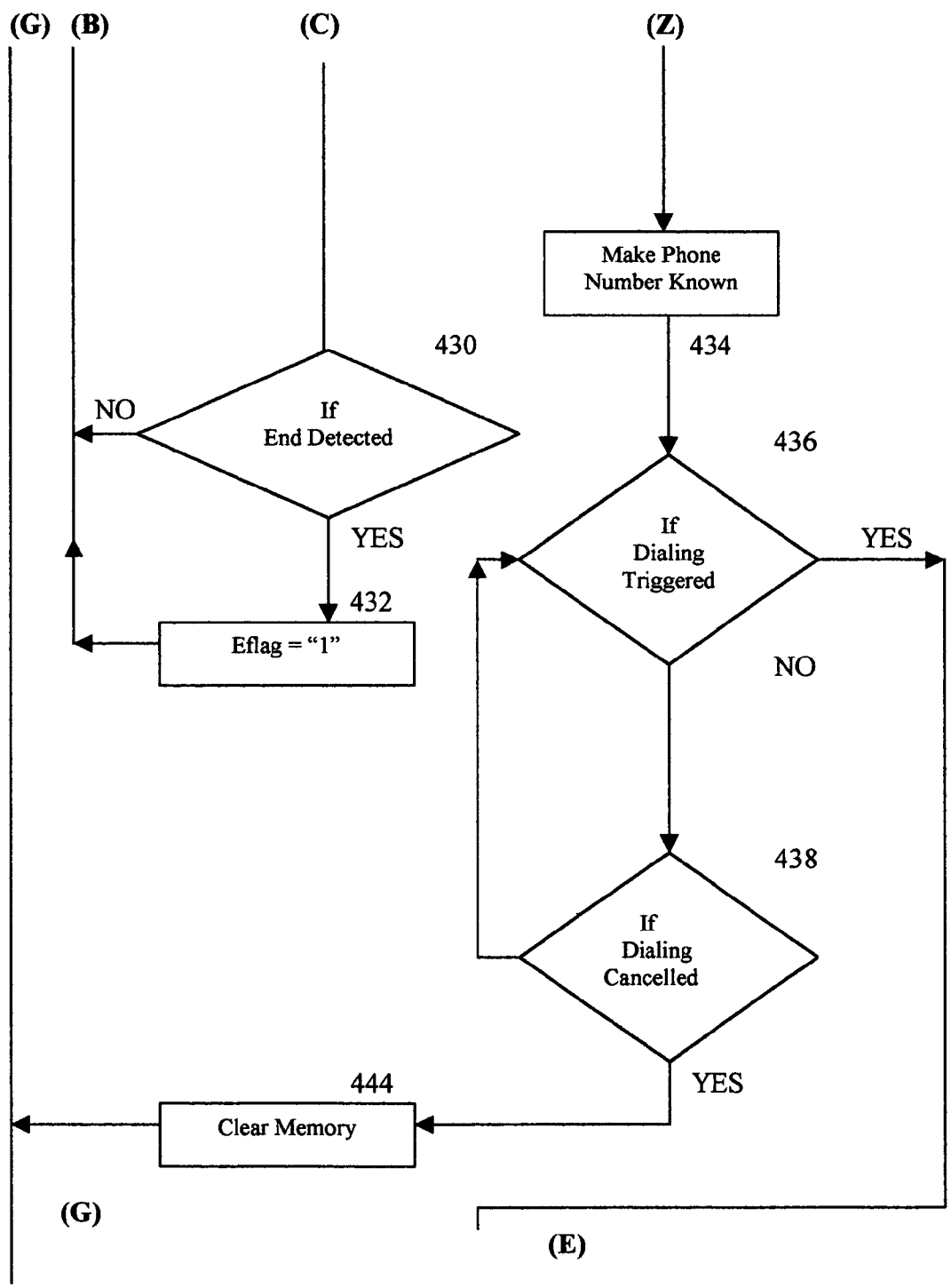

In the preferred embodiment, once an Off Hook state is detected, the stamp 124 will monitor the line connection between the phone 110,110' and the PSTN for an incoming telephone number (FIG. 4A, step 404–410). The Pitcher monitors the Eflag (FIG. 4A, step 408) to determine when the complete phone number has been captured. The Pitcher (120) will monitor the phone line for a C.O.D.A. query, an electrical signal that will elicit a response from a any phone with a Pitcher attached to it, or a phone with Pitcher circuitry within it (FIG. 4B, step 416). When the Pitcher responds with a signal that is recognized as a confirmation of pitcher functionality (FIG. 4B, steps 418–422). In the preferred embodiment, the C.O.D.A. query is two pound symbols (##), and the positive response is two asterisks () The asterisks are an acknowledgment of the presence of a phone with Pitcher capability connected to the PSTN (FIG. 4B, step 422). Detection of a C.O.D.A. query (FIG. 4B, step 416) will tell the Pitcher that a DTMF tone formatted phone number is about to be sent via the PSTN. The Pitcher will now monitor the phone line for the start of the sent Phone number (FIG. 4B, step 426). The Pitcher 120 will save to memory all of the detected DTMF tones encountered after the Start signal (FIG. 4A, steps 404–412). The Pitcher will stop saving DTMF tones once it encounters the End signal (FIG. 4C, steps 408). The Pitcher will make known the captured phone number (FIG. 4C, step 434). The Pitcher will then await the trigging of the Dialing process (FIG. 4C, step 436), or the canceling of the Dialing process (FIG. 4C, step 438**).

In the preferred embodiment, the transmitted phone number will be presented to the Pitcher in a format with a pound and an asterisk symbol at the beginning of the number, an Asterisk and a Pound symbol at the end of the phone number, and the phone number in between (i.e. #*12125551212*#). The Format can be modified to include address location too, (i.e. ##*12127721205*# 123 East $555^{th}$ Street and Second Avenue#). In one embodiment, the address and phone number transmitted may have the following format: two pound signs and an Asterisk symbol, the phone number, then an asterisk and a pound symbol, and last the text information with a trailing pound symbol.

Wireless Telephone Sensory Process

The process of detecting and dialing a captured telephone number using a wireless phone 190,190' will now be described referring back to FIG. 1 and FIGS. 5–9.

Figure 5A:
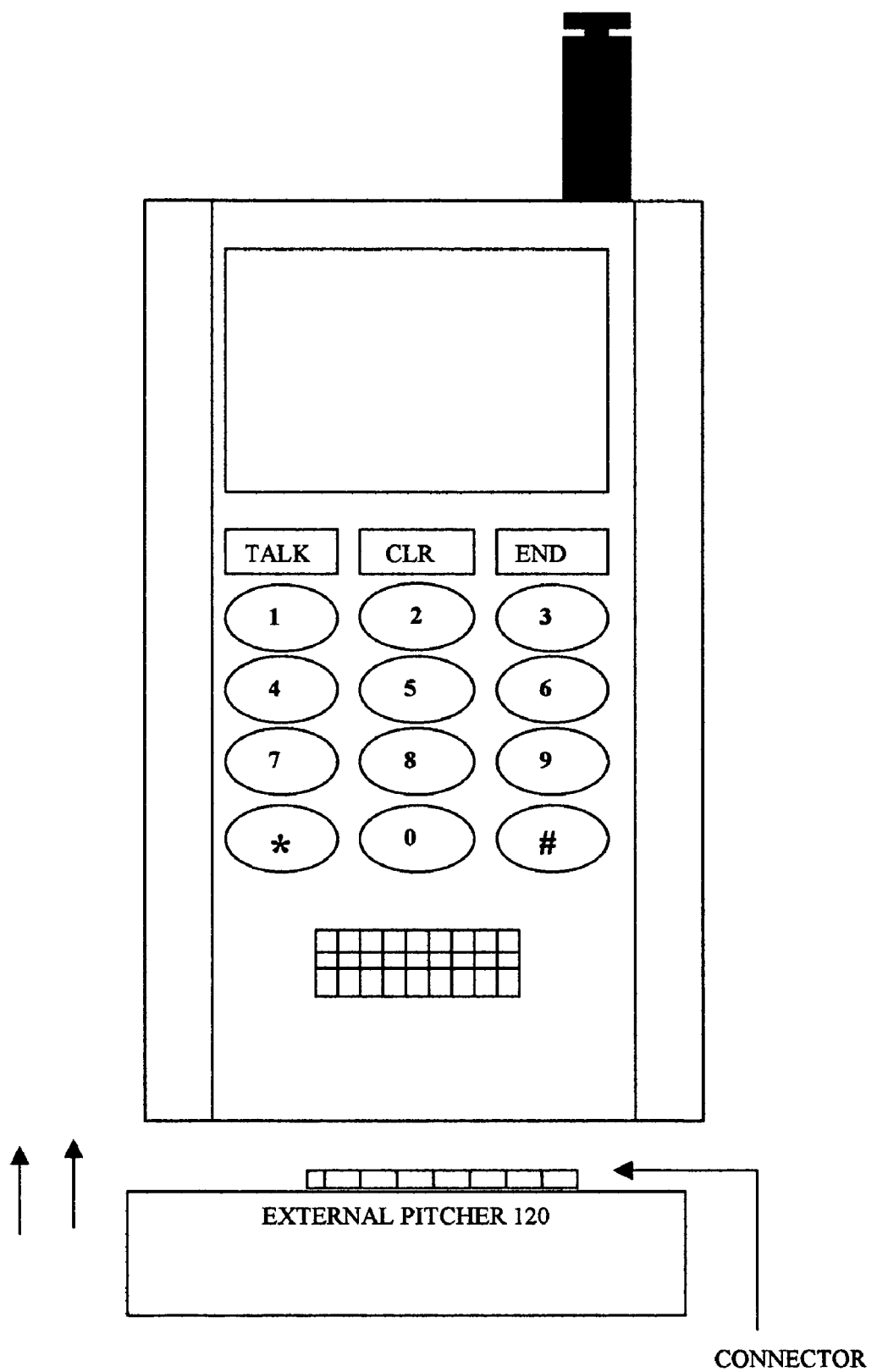
FIG. 5A is an illustration of the pitcher system attached externally to a wireless/cellular telephonic device according to one embodiment of the system.
Figure 5B:
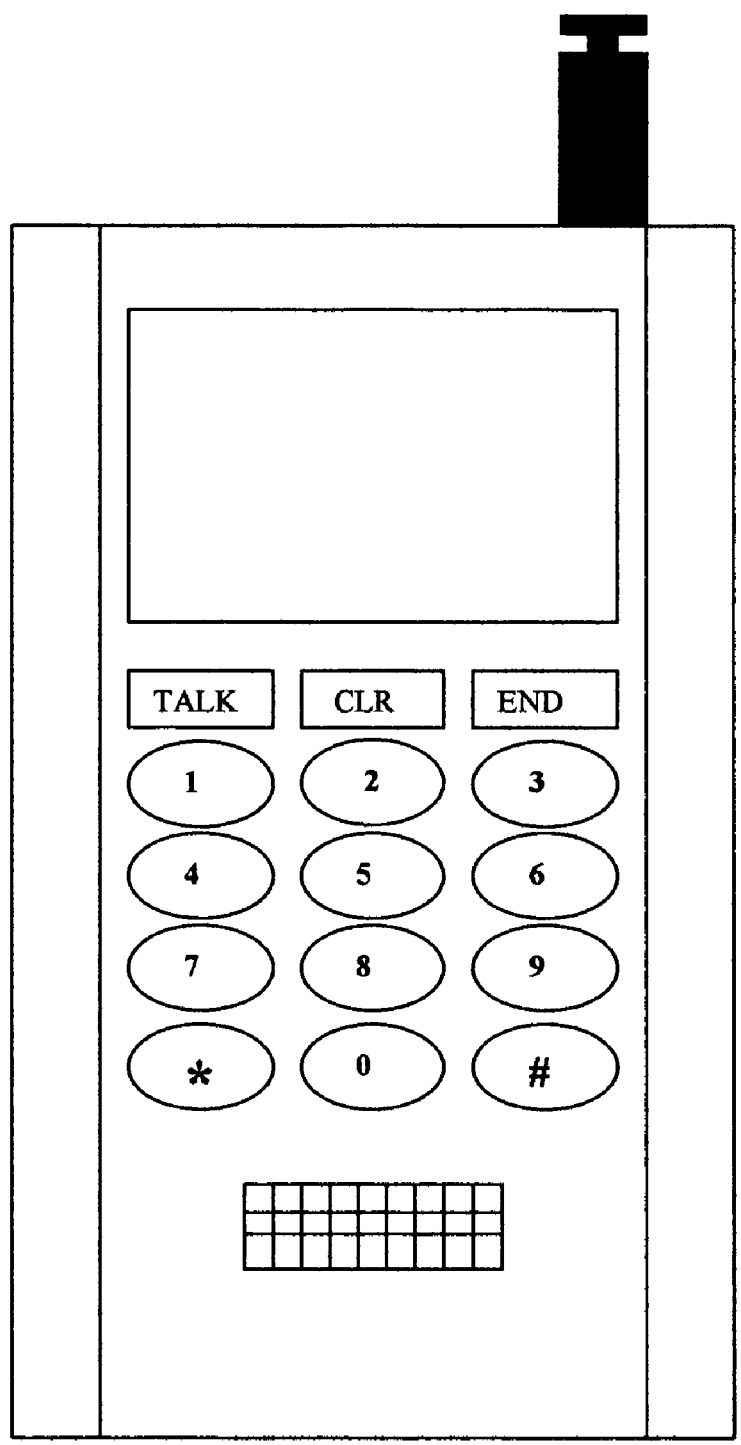
FIG. 5B is an illustration of the pitcher system integrated into a wireless/cellular telephonic device according to one embodiment of the system.

A Pitcher 120 working with a Cell phone or other wireless device (190, 190') will not require the same kind of sensors that are used with a land line phone (110,110'), because of the construction and functionality differences between that of a wired and a and a wireless telephone, and how they connect to the communication network 100. A cell phone (190,190') does not experience a Time-Out event, high voltage Ringing, or an Off-Hook State. Thus, there is no need to have an R.O.T. sensor array. In a cellular phone (190,190') all functions, including Ringing, Active State, Transmitting, and keypad input, are low voltage and digital in nature, and even voice/conversation is digitized in a wireless device (190). Cellular phones (190,190') contain microprocessor chips that monitor, synchronize, and regulate the functions of the cellular phone (190,190'). A Pitcher (120) can be either an integrated component of a wireless device (FIG. 5B), or an external attachment (FIG. 5A). In both instances the Pitcher's microprocessor would have to be in communication with the cell phone (190,190') so that it can share information gathered by the wireless device circuitry. The wireless device circuitry is used as sensors for the Pitcher (120). These circuits tell the Pitcher when the wireless device is active: when it is able to accept incoming call, able to make outgoing call, when a telephone number is being entered/dialed, what the telephone number is, when the telephone number is being sent out into the wireless communication network, et cetera. In FIG. 5A the external Pitcher 120 attaches to the cellular phone 190 via a connector or data port located on the cell phone.

In the preferred embodiment (FIG. 5B, FIG. 6A and FIGS. 7A and 7B), both the Cellular phone 190 and Pitcher circuitry are integrated into a single wireless device 190'. A Virtual Pitcher (V-Pitcher) can be created by taking advantage of components already present in the wireless device, and reducing the number and nature of additional components that would be required to give a wireless device Pitcher capability.

The Digital Signal Processing chip (DSP) is a specialized high-speed microprocessor that is common component of cellular phones, it can be programmed to perform a variety of tasks related to audio manipulation and digitization. A DSP chip (FIG. 6A-600) can be programmed to monitor the incoming signals from the communication network (FIG. 1-100). Memory in the form of RAM (Random Access Memory-used for processing data), Storage Memory (used for storing information/program coding), and a microprocessor chip are also common components of all cell phones (190,190'). The combination of DSP, memory for storing program coding, and a microprocessor to run the coding can be used to create a virtual Pitcher within a cellular phone. The programming required to enhance a normal cell phone (190) and create a virtual Pitcher (V-Pitcher) would be similar to, but not limited to the embodiment shown in FIG. 7. The Rflag is an indicator used by the Pitcher's programming to acknowledge detection and response to a C.O.D.A. query. The acknowledgment indicates to the C.O.D.A. that the calling wireless device has Pitcher capability.

Wireless Telephone Coding

Figure 7A:
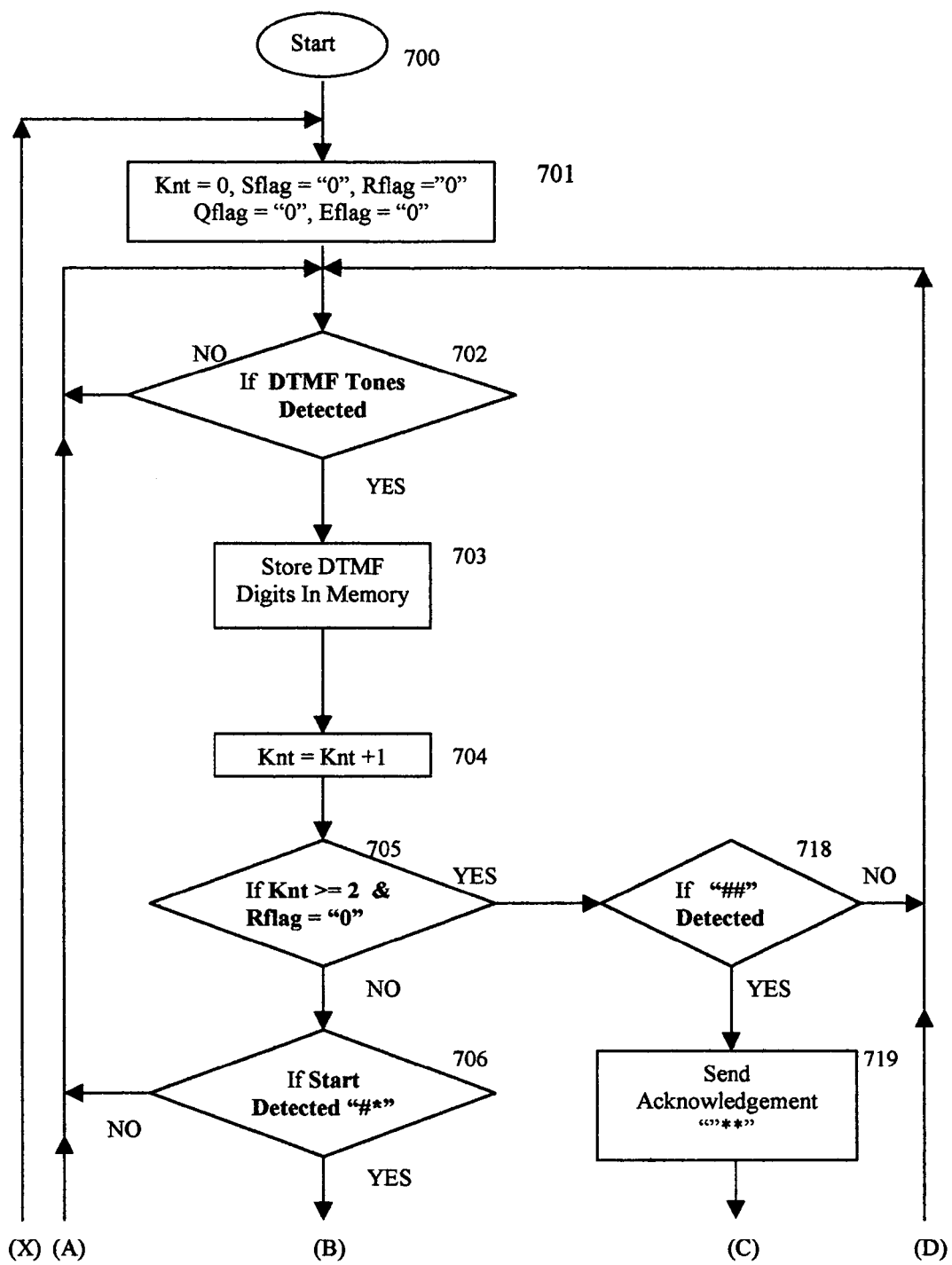
FIGS. 7A and 7B is a flowchart showing the operation of the pitcher system working with a wireless telephonic device according to one embodiment of the system.
Figure 7B:
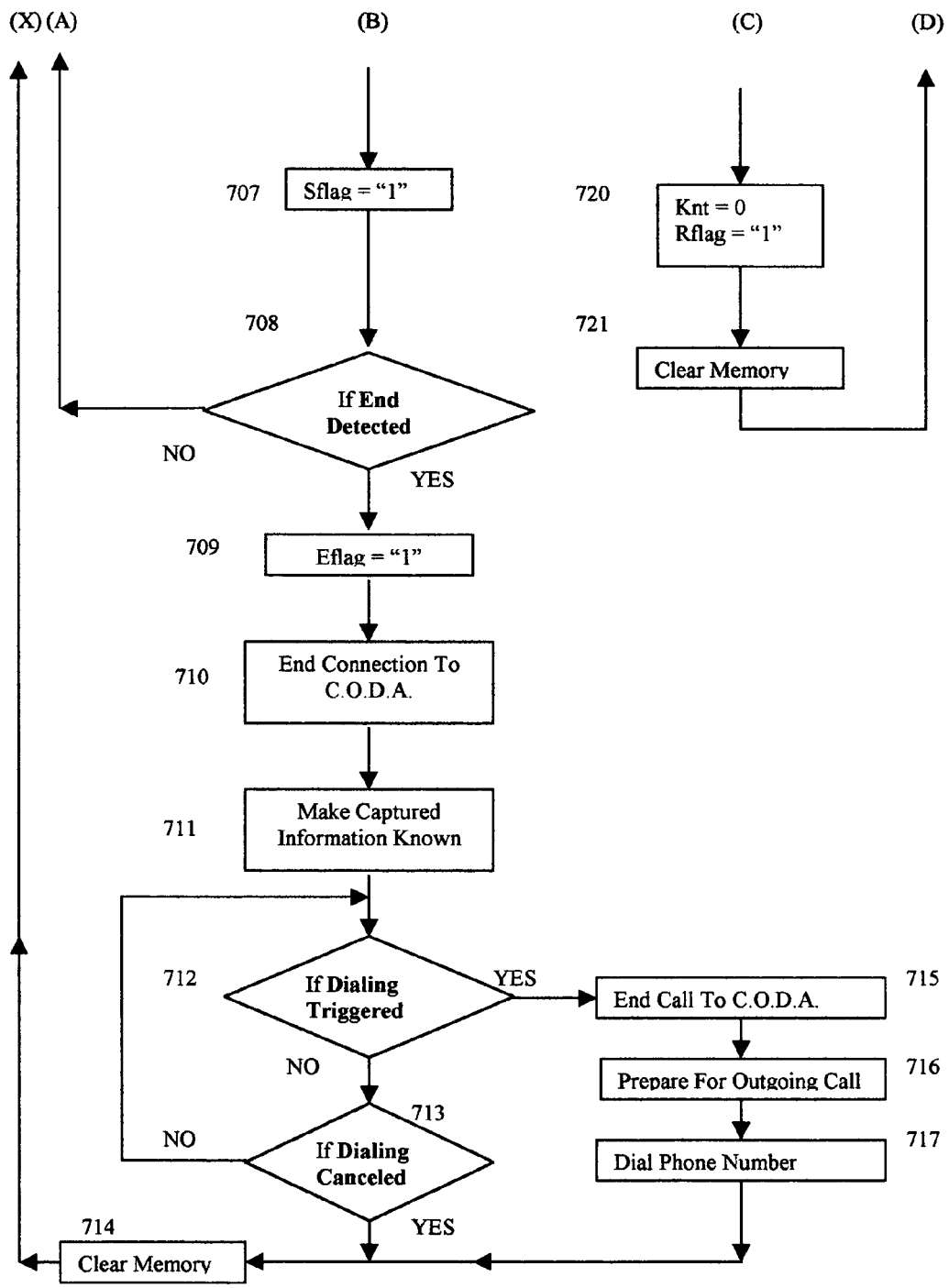
Figure 8A:
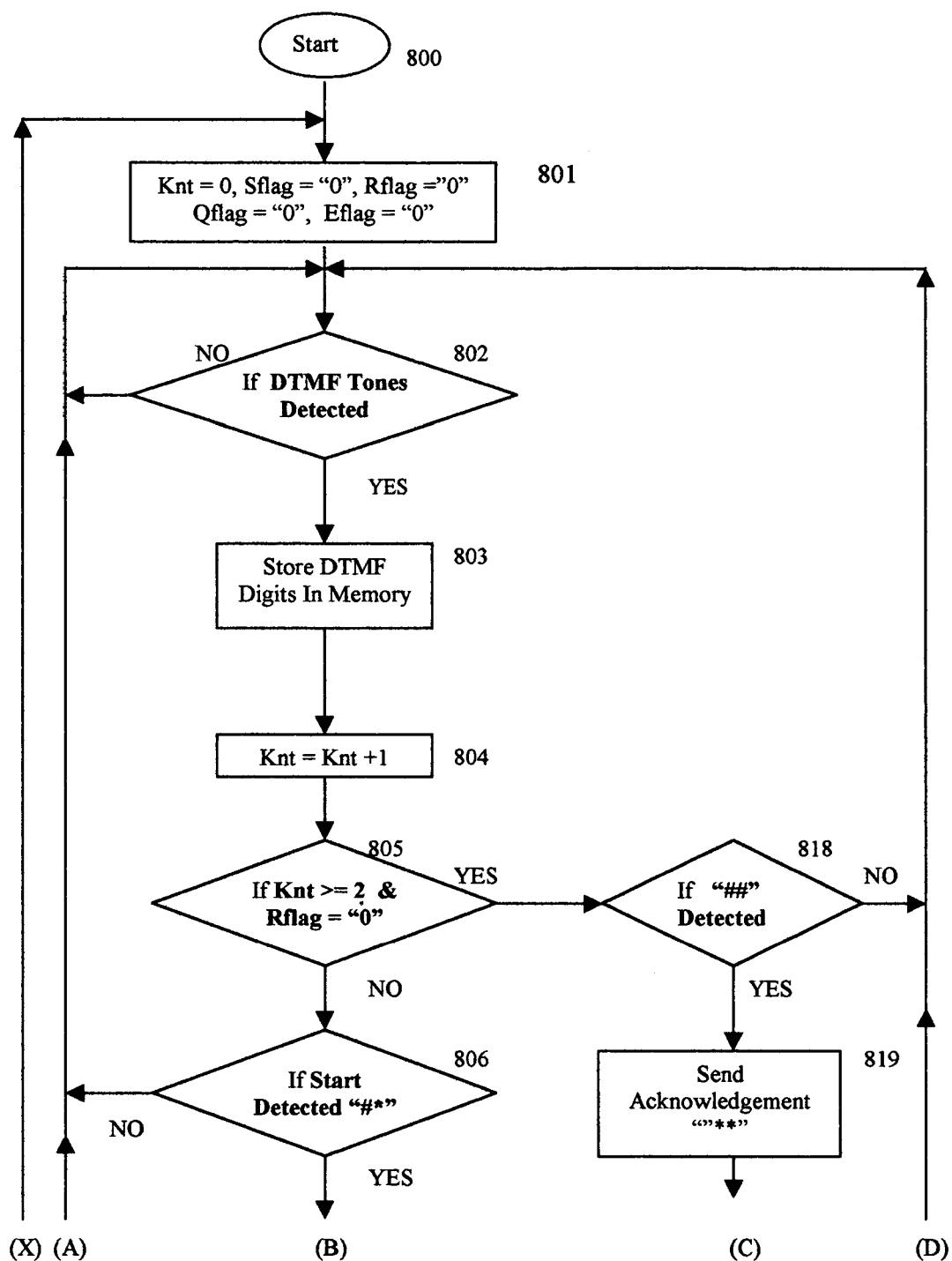
FIGS. 8A and 8B is a flowchart showing the operation of the pitcher system with a wireless telephonic device according to one embodiment of the system.
Figure 8B:
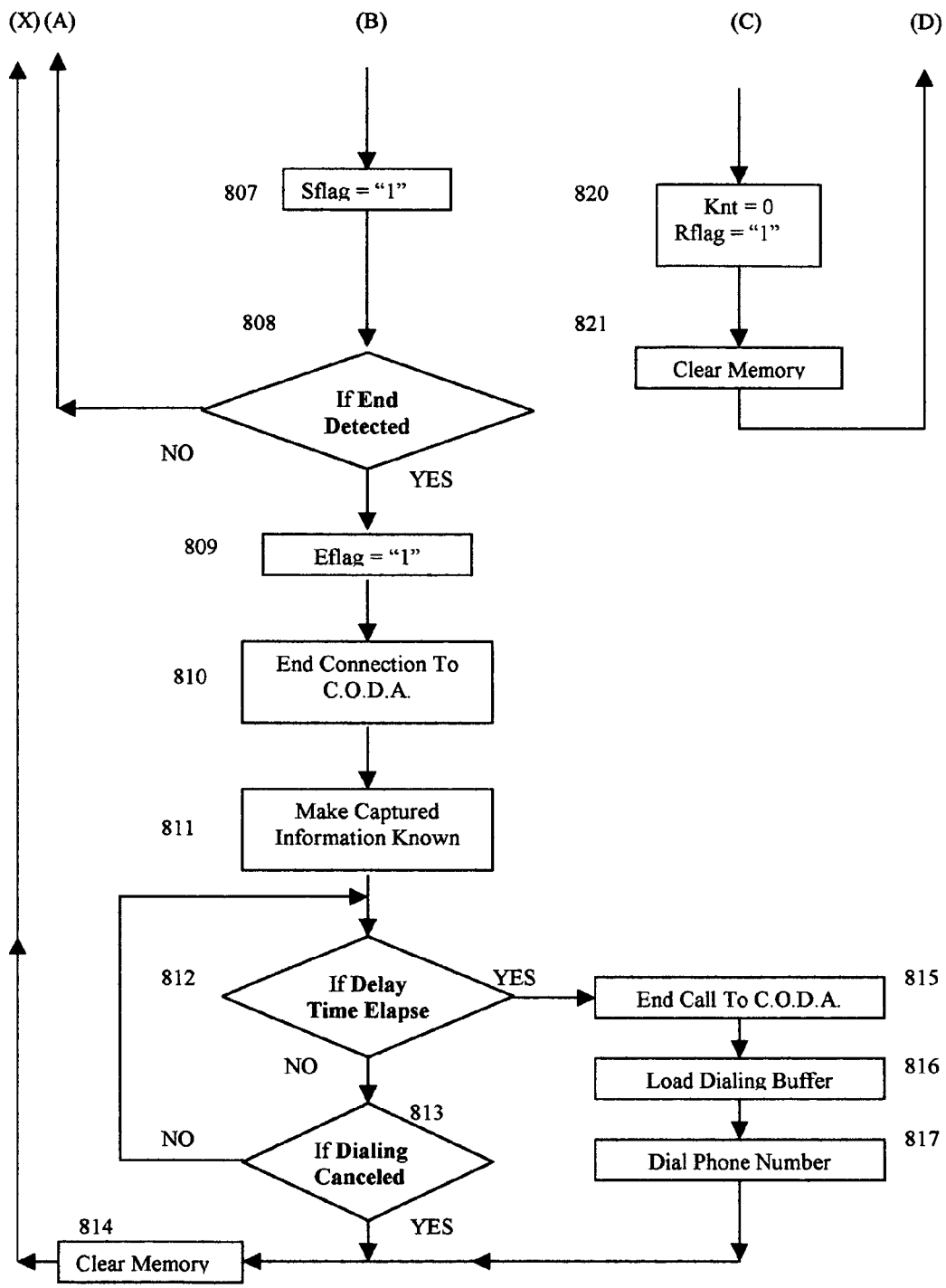

The V-Pitcher would be programmed to detect incoming signals that code for two pound symbols ("##"): the query used by a C.O.D.A. to determine if the telephonic device (190,190') has Pitcher capability (FIG. 7A, step 718). If the telephonic device has pitcher capability, the telephonic device microprocessor programming will respond to the inquiry with the proper acknowledgment (FIG. 7A, step 719), by introducing two asterisk symbols into the network (""). The telephonic device will proceed to capture and save to memory any detected signals that code for DTMF tones (FIG. 7A, step 703). Once the V-Pitcher detects the end signal, the program stored in the telephonic device memory 602 checks the captured string of DTMF tones (FIG. 7B, step 708). The microprocessor will process the stored information to determine what was captured, whether it is a phone number, a text message, or a phone number and a text message. Once the Pitcher has determined that it has a telephone number, it will initiate the dialing process. First, it would make known the phone number by displaying it on the cell phone's display screen (liquid crystal display-LCD), or by audio output (FIG. 7B, step 711). The Pitcher, depending on its configuration, would then either await user instructions to start dialing the captured phone number, or initiate dialing the captured phone number of its own accord (FIG. 7B, steps 712–717 or FIG. 8B, steps 812–817**).

In one embodiment, the dialing process consists of inducing the effect of pressing the appropriate button to mimic a user entering and dialing a phone number using a wireless telephonic device (cell phone). The first button would be the call end button ("END"), the button that terminates any ongoing call and sets up the phone for receiving an incoming call or making a new outgoing call. The End button terminates the connection to the C.O.D.A. while maintaining contact with the communication network. Then the Pitcher would enter/load the captured phone number into the dialing buffer. The dialing buffer in this embodiment represents the place where digits of a phone number are stored as they are being dialed into the phone. The last step of the procedure is pressing the "SEND" or "TALK" button. The contents of the dialing buffer are display to the cell phone user, allowing for visual detection of error in dialing. Press the "SEND" or "TALK" button will cause the captured number store in the dialing buffer to be dialed: to be sent to the PSTN for routing the call to a destination. Cell phones have a variety of command buttons, and the order and number of buttons used to dial a phone number can vary from one cell phone manufacture to another manufacture. The number, name, order of buttons pressed or commands used to dial a phone number stated here is intended to illustrated one of many ways to effect the process, and therefore are not defining limitations of the present invention.

In an alternate embodiment (FIG. 8), the Pitcher will not require the user to initiate the dialing process. The Pitcher will simply wait a short period of time before initiating the dialing process itself. The wait will allow the user time enough to cancel the call if desired.

In another embodiment, the format of the transmitted information will indicate what is being transmitted to the telephonic device. For example, if the format corresponds to pound symbol, asterisk symbols, digits, asterisk Symbol, and pound symbol ("#*12121231234*#"), then a phone number has been captured. If the format corresponds to two pound symbols, two asterisk symbols, and a pound symbol ("###287 East 23 Street"), then a text message has been captured. If the format corresponds to two pound symbols, an asterisk symbol, digits, an asterisk symbol, a pound symbol, text, and a pound symbol ("##*12121231234*# 287 East 23 Street#"), then a phone number and a text message has been captured.

Figure 6A:
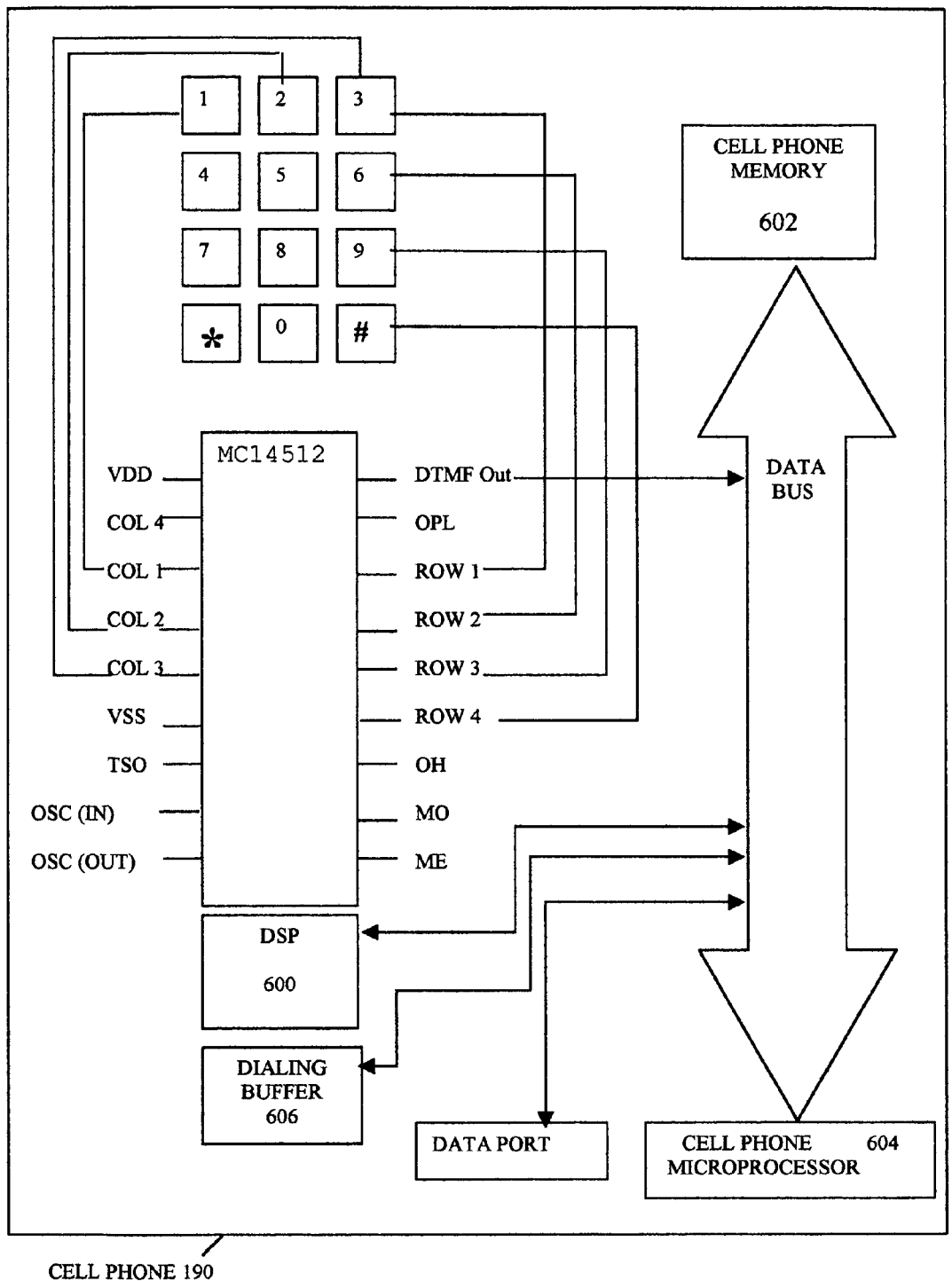
FIGS. 6A and 6B are illustrations of an internal and external pitcher system with a wireless telecommunications device according to one embodiment of the system.
Figure 6B:
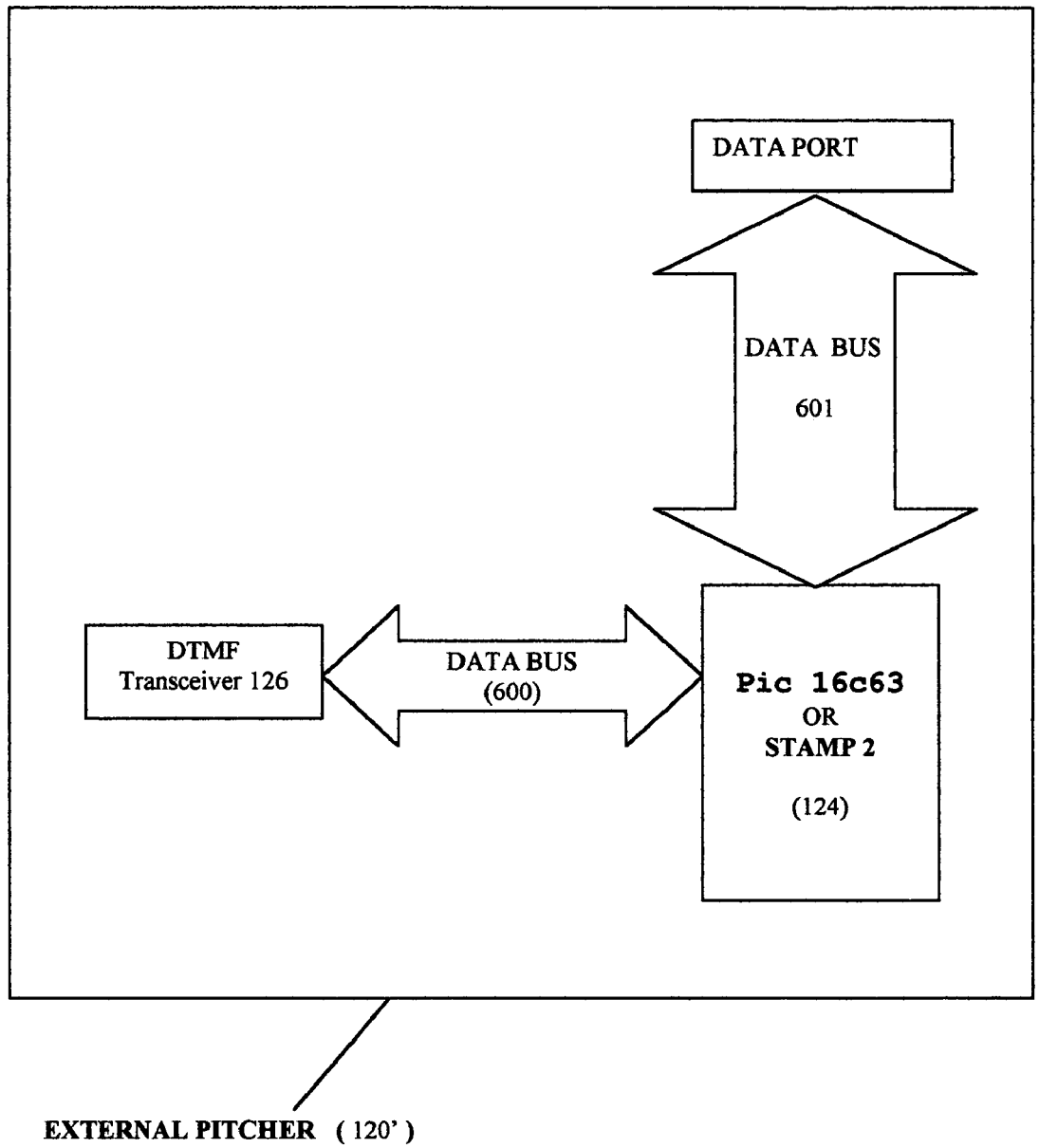

In an another alternate embodiment (FIG. 5A & FIG. 6B), the Pitcher is an external component of the wireless telephonic device 190. The Pitcher connects to the telephone device via a connector or data port (FIG. 5A & FIG. 6B), connecting the Pitcher to the cell phone. The data bus forms a connection over which information/instruction can flow between the wireless device and the Pitcher (FIG. 6B-602). Many cell phones or other telephonic devices come with such ports already build into them for linkage to portable computers. The pitcher can monitor the activity of the cellular phone for specific activities, by communicating with the cell phone microprocessor.

The Digital Signal Processing chip (DSP) is a specialized high-speed microprocessor that can be programmed to perform a variety of tasks related to audio manipulation and digitization (a common component of cellular phones). A DSP chip can be programmed to monitor the incoming signals from the communication network and relay them to the microprocessor. The data bus linking the cell phone to the Pitcher can convey detected DTMF tones.

The cell phone's microprocessor controls and monitors all of the activities of the cell phone. The microprocessor monitors the keypad to determine if and when a key is pressed. The microprocessor controls the execution of all called functions/features of the cell phone. All information displayed on the cell phone display panel (LCD) is controlled by the microprocessor. Information/phone number that is loaded into the dialing protocol (dialing buffer) of the cell phone is regulated by the microprocessor. The dialing of a phone number is controlled by the cell phone microprocessor. Everything that happens within the cell phone is communicated to the microprocessor, and the microprocessor can communicate the required information to the Pitcher via the connection port. The connection port is a data bus linking the two entities (Pitcher and Cell Phone). The microprocessor can also determine what keys are being pressed on the keypad, and relay that information to the Pitcher via the connection port.

The Pitcher can check DTMF tones detected by the cell phone DSP chip to determine if they constitute a query signal from a C.O.D.A. Once the Pitcher has determined that the cell phone has detected the C.O.D.A. query flag, it will instruct the cell phone to generate the response signal ("**"). The response signal is transmitted to the C.O.D.A., and the C.O.D.A. will transmit the requested information in the proper format. Once the user has received a phone number at his phone, he may then immediately call that number.

The dialing process consists of simulating the pressing of certain buttons on the wireless device keypad. The Pitcher will communicate to the wireless telephonic device instructions that will effectuate the dialing of the captured phone number. This will involve clearing the dialing buffer, loading in the capture phone number into both the dialing buffer and the display panel (LCD). The dialing buffer holds the phone number that is about to be dialed. The Pitcher will instruct the cell phone to end its connection to the C.O.D.A. by simulating pressing the "END" button, causing the cell phone normal "Call Termination Protocol" to be executed. Pressing the "END" button is similar to a hang-up of a wired telephone handset. The Pitcher will effect the loading of the capture phone number from its memory into the cell phone dialing buffer, the stored number will be transmitted through the connection port using data bus. Once the Pitcher has instructed the Cell phone to accept the capture phone number into it dialing buffer. The last step of the procedure in this embodiment is simulating the effects of pressing the "SEND"/"TALK" button, causing the cell phone normal "Call Initiation Protocol" to be executed. This causes the dialed phone number to be sent to the PSTN for routing according to the phone number.

A query ("##") is sent from a C.O.D.A. that is about to send information, whether it is a phone number or text. The query ("##") is used to determines the presence of a pitcher at the receiving end of the call. The Pitcher enabled wireless device detecting the C.O.D.A. query would respond with an acknowledgment signal (), telling the C.O.D.A. its presence (FIG. 7A, steps 718–719**). The C.O.D.A. then forwards the phone number or other information to the recipient. The recipient identifies the type of information received by the data format used, such as a telephone number bracketed by a leading pound and asterisk (#*) and a following asterisk and pound (*#), #*12121231234*# (FIGS. 7A and 7B, steps 703–708). Other formats may be employed to transmit information to the wireless device 190,190', especially phones with displays that can show the information captured by the phone. The pitcher would make known the captured phone number (FIG. 7B, step 711), by loading it into the display panel or dialing buffer.

In the preferred wireless embodiment, the pitcher makes known the captured phone number by visual display or audio output. The Pitcher's microprocessor is linked to an audio chip that has the digits 0–9 stored and key words (i.e. Street, Route, Lane, Drive, Avenue, Boulevard, North, East, South, and West) in its memory. The Pitcher will prompt the microprocessor to audibly play the captured phone number digit by digit at an adjustable rate for verification. If the rate is set at 0.5 second interval per digit for a ten digit phone number, the elapsed time would be about five seconds. This will enable the pitcher user to know the phone number that is about to be dialed. Another method of making known the telephone number about to be dialed to display the number on the display panel normally built into a cell phone (190, 190'). A simple serial connection between the microprocessor and a display output on the phone will inform the phone user of the number about to be dialed. ASCII code and DTMF tones could be used to encode the text portion of the information sent from the C.O.D.A.

In the preferred embodiment, after loading the captured phone number into the dialing buffer and making known the number, the pitcher will pause before auto-dialing the phone number. The pause duration can be programmed to give the user the amount of time they want before action is taken, such as 3 sec., 5 sec., 7 sec., 10 sec., and infinity. The action taken by the pitcher can be auto-dialing of the captured phone number, or an infinite wait for a dial command (FIG. 7B, step 712–713). 1181 If auto-dial is selected, the process may be terminated by a stop command. The stop command may be a single keystroke or multiple keystrokes. The captured number remains in the dialing buffer for later retrieval.

In another alternate embodiment, the dialing process can be initiated by a spoken command, via a word that triggers the process. The word could be "Dial", "Execute", or anything that can be programmed.

In another alternate embodiment, the pitcher's microprocessor can interface with the cell phone's microprocessor or the chip that captures keystrokes from the keypad and converts them into electrical signals. A MC145412 chip manufactured by Motorola can be used to capture the keystrokes of a cell phone keypad. The pitcher microprocessor will look for an outgoing signal for Information or Directory Assistance, such as "0", "XXX5551212", OR "411". Once the pitcher has detected the outgoing phone number for a C.O.D.A., it will set itself up to capture all detected incoming DTMF tones as a phone number. The pitcher's microprocessor interfaces with the wireless device's microprocessor, allowing the pitcher to capture and store received phone numbers, and to load the captured phone number into the dialing buffer. Once the captured phone number is in the dialing buffer, the wireless device can dial number, or the user can start the dialing process by pressing the "Redial Button" or some other button or combination.

Figure 9:
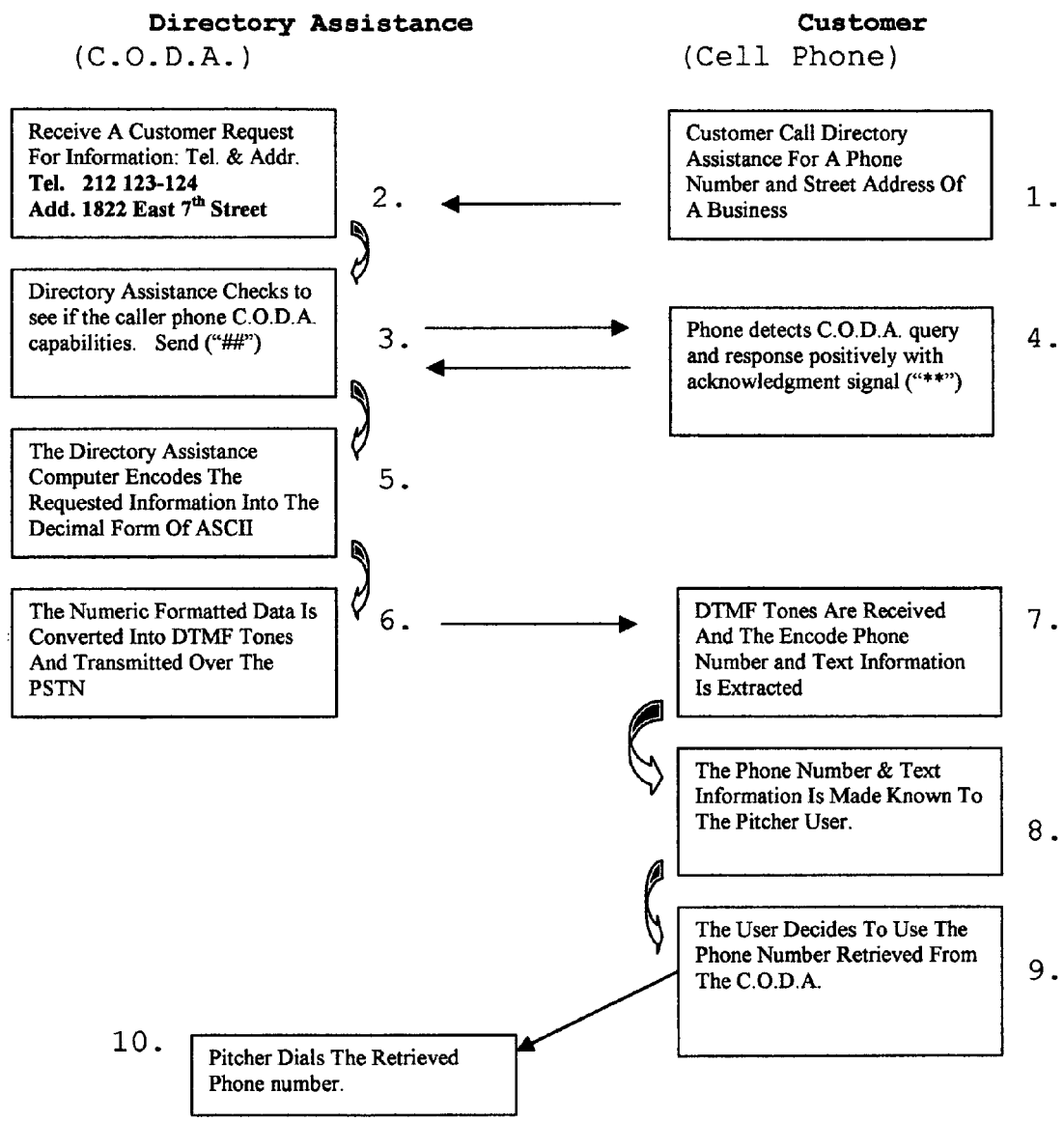
FIG. 9 is a flowchart showing a method of operation of the pitcher system according to one embodiment of the system.

FIG. 9 illustrates the Procedural steps of the Pitcher Interaction with a C.O.D.A. In step 1, A customer with a Pitcher-equipped phone calls directory assistance (the D.A. of C.O.D.A), and asks for a phone number, and Directory Assistance retrieves the information requested by the caller in step 2. In step 3, the Directory Assistance system checks to determine if the customer's phone has Pitcher capability by sending the query signal, "##". In step 4, when the customer's phone has Pitcher capability, it will detect the query and respond to the signal with a signal of its own, "". In step 5, the Pitcher knows that there is a pitcher-enabled phone on the other end, so the C.O.D.A. will encode the information into the decimal format of ASCII. In step 6, the Formatted information is transmitted over the communication network in the form of DTMF tones. The caller's phone will capture the transmitted DTMF tones and Decode the digits back into ASCII information at step 7. The decoded information is made known to the requester at step 8, and the Pitcher waits for the user to decide to use the information in step 9. Finally, when the user decides to use the information, the Pitcher dials the phone number at step 10**.

What is claimed:

1. A method for hand-free dialing of a phone number obtained from a Callers using a dialing device, Operator, or Directory Assistance (CODA) over a communication network using a dialing device, comprising:

a. determining whether a dialing device is able to retrieve information from a CODA in a non-verbal electronic format over a communication network;
b. collecting the signals that encode transmitted information;
c. determining if the received information contain a phone number, text information, or both;
d. making the transmitted information known to the user of the hand-free dialing device;
e. hand-free and automatically dialing the digits of the transmitted phone number.

2. The method according to claim 1, further comprising: a signal from the dialing device that tells the CODA that said dialing device can handle information transmitted in a electronic format.

3. The method according to claim 1, wherein determining whether a directory assistance call is being made is accomplished by determining whether the dialed digits meets a predetermined sequence of digits.

4. The method according to claim 1, wherein the dialing device makes known the information received from the CODA in either a visual or audio format.

5. The method according to claim 3, wherein the CODA electronically transmits information that contains a phone number to the dialing device over a communication network.

6. The method according to 1, wherein the dialing device that receives the information transmitted over a communication network is either a wired or wireless telephonic device.

7. The system according to claim 1, wherein the CODA transmits the requested information in a high-speed electronic signal format using DTMF tone.

8. The system according to claim 1, further comprising: detecting a signal that indicates the start of the information being transmitted by the CODA.

9. The system according to claim 1, further comprising: detecting the signal that indicates the end of the information being transmitted by the CODA.

10. The method according to claim 1, wherein determining the start of the transmitted information to the dialing device is accomplished by detecting a predetermined number of electronic signals that meet a predetermine sequence.

11. The system according to claim 1, wherein the communication of information between the CODA and a dialing device is accomplished by the detection of a predetermined number of electronic signals in a specific arrangement constituting indicator flags, and electronic signals in a non-specific sequence constituting information.

12. The system according to claim 1, wherein determining the end of the transmitted information to the dialing device is accomplished by detecting a predetermined number of electronic signals that meet a predetermine sequence.

13. A system for a dialing device to rapidly retrieve information from a CODA (Callers using a dialing device, Operator, or Directory Assistance) and execute hand-free dialing of a phone number contained within said information after making known the phone number to the dialing device user, comprising:
means for a dialing device to be able to generate a recognizable signal that causes an outgoing call to a directory to be routed to a directory assistance center able to transmit information in a non-verbal high-speed electronic format;
means for a CODA to recognize an incoming call from a dialing device able to receive and process information transmitted in a non-verbal electronic format;
means for the CODA to transmitted information in real time at high-speed to a dialing device over a communication network;
means for the dialing device to make known the phone number received from the CODA; and
means for hand-free and automatically dialing the digits of the received phone number.

14. The system according to claim 13, wherein determining the end of the transmitted information to the dialing device is accomplished by detecting a predetermined number of electronic signals that meet a predetermine sequence.

15. The system according to claim 13, wherein determining the dialing device ability to handle information transmitted in a non-verbal format is accomplished by detecting a predetermined number of electronic signals arranged in a predetermine sequence that constitute a positive indicator for this ability.

16. The system according to claim 13, wherein the dialing device generates a signal indicating that the requested information be send back in a non-verbal format is accomplished by the CODA detecting a predetermined electronic signal specific to this type of request.

17. The system according to claim 13, wherein the communication of information between the CODA and a dialing device is accomplished by the detection of a predetermined number of electronic signals in a specific arrangement constituting indicator flags, and electronic signals in a non-specific sequence constituting information.

18. Computer executable software code stored on a computer readable medium, the code for hand-free dialing of a phone number retrieved from a CODA (Callers using a dialing device, Operator, or Directory Assistance) in a high speed non-verbal electronic format, comprising:
computer executable software code for determining whether information transmitted in a high-speed non-verbal format over a communication network contain a phone number;
code for a dialing device to signal to a CODA (Callers using a dialing device, Operator, Directory Assistance) indicating its ability to process information transmitted in a non-verbal format;
code for capturing information transmitted in a non-verbal format from a CODA to a dialing device;
code for determining whether the information transmitted by the CODA contains a phone number;
code for revealing a phone number contained in the transmitted information to the dialing device user;
code for hand-free auto-dialing of a phone number received from a CODA.

19. Computer executable software code according to claim 18, further comprising:
a dialing device storing software coding for encoding and decoding electronic signals from a Callers using a dialing device, Operator, or Directory Assistance (CODA);
and coding for converting electronic signals from a CODA into a visual display or an audio message direct at the dialing device user.

20. Computer executable software code according to claim 18, further comprising:
code for storing information received by a Callers using a dialing device, Operator, or Directory Assistance (CODA) from an incoming call from a dialing device.

* * * * *